(12) United States Patent
Dickie et al.

(10) Patent No.: US 12,038,921 B2
(45) Date of Patent: Jul. 16, 2024

(54) TRANSFORMING OPERATIONS OF A COMPUTER PROGRAM FOR EXECUTION AT A DATABASE

(71) Applicant: Ab Initio Technology LLC, Lexington, MA (US)

(72) Inventors: Garth Dickie, Framingham, MA (US); Ian Schechter, Sharon, MA (US)

(73) Assignee: Ab Initio Technology LLC, Lexington, MA (US)

( * ) Notice: Subject to any disclaimer, the term of this patent is extended or adjusted under 35 U.S.C. 154(b) by 149 days.

(21) Appl. No.: 17/012,633

(22) Filed: Sep. 4, 2020

(65) Prior Publication Data

US 2022/0075778 A1 Mar. 10, 2022

(51) Int. Cl.
G06F 16/2452 (2019.01)
G06F 16/242 (2019.01)
G06F 16/2455 (2019.01)

(52) U.S. Cl.
CPC .... G06F 16/24526 (2019.01); G06F 16/2448 (2019.01); G06F 16/24553 (2019.01); G06F 16/24564 (2019.01)

(58) Field of Classification Search
CPC ........... G06F 16/24526; G06F 16/2448; G06F 16/24553; G06F 16/24564
See application file for complete search history.

(56) References Cited

U.S. PATENT DOCUMENTS

| | | | |
|---|---|---|---|
| 5,966,072 A | 10/1999 | Stanfill et al. | |
| 6,785,673 B1 | 8/2004 | Fernandez et al. | |
| 7,447,686 B2 | 11/2008 | Levine | |
| 8,645,346 B2 | 2/2014 | Dumitru et al. | |
| 8,914,807 B2 * | 12/2014 | Crisan | G06F 16/24553 707/600 |
| 9,535,948 B1 * | 1/2017 | Cuthbert | G06F 16/2452 |
| 2005/0289125 A1 * | 12/2005 | Liu | G06F 16/2448 |
| 2007/0027905 A1 * | 2/2007 | Warren | G06F 16/2452 |
| 2019/0370407 A1 | 12/2019 | Dickie | |

(Continued)

OTHER PUBLICATIONS

U.S. Appl. No. 15/993,284, filed May 30, 2018, Dickie.

(Continued)

*Primary Examiner* — William Spieler
(74) *Attorney, Agent, or Firm* — Fish & Richardson P.C.

(57) ABSTRACT

A method includes executing a program that specifies operations and accessing a translation file that includes instructions for translating the language of the program into a language of a database. The translation file specifies operations in the language of the program that are supported by the database and the semantic meaning of the supported operations in the language of the database. Operations of the program that are unsupported by the database are processed by the program. Operations of the program that are supported by the database are determined from the translation file, and a portion of the program representing the supported operations is translated, using the translation file, into the language of the database and transmitted to the database. Data resulting from execution, within the database, of the translated portion of the program representing the operations that are supported by the database is received by the program.

24 Claims, 30 Drawing Sheets

(56) References Cited

U.S. PATENT DOCUMENTS

2022/0035611 A1* 2/2022 Cseri .................. G06F 16/2448

OTHER PUBLICATIONS

Cdata.com [online], "Object-Relational Mapping (ORM) with Snowflake Data Entities in Java," available on or before Feb. 3, 2020, retrieved on Feb. 3, 2020, retrieved from URL<https://www.cdata.com/kb/tech/snowflake-jdbc-hibernate.rst>, 4 pages.

Github.com [online], "Create a Tableau Dialect Definition (TDD) File," available on or before Feb. 3, 2020, retrieved on Feb. 3, 2020, retrieved from URL<https://tableau.github.io/connector-plugin-sdk/docs/dialect>, 5 pages.

IBM.com [online], "Netezza SQL Introduction," last updated Apr. 13, 2016, retrieved on Feb. 3, 2020, retrieved from URL<https://www.ibm.com/support/knowledgecenter/SSULQD_7.2.1/com.ibm.nz.dbu.doc/c_dbuser_ntz_sql_introduction.html>, 4 pages.

Informatica, "Informatica PowerCenter 10.2: Advanced Workflow Guide," last updated Jun. 3, 2019, 323 pages.

SAP Data Services, "Performance Optimization Guide—Document Version: 4.2 Support Package 8 (14.2.8.0)," Jan. 18, 2017, 124 pages.

Snowflake.com [online], "Using the Snowflake SQLAlchemy Toolkit with the Python Connector," available on or before Feb. 3, 2020, retreived on Feb. 3, 2020, retrieved from URL<https://docs.snowflake.com/en/user-guide/sqlalchemy.html>, 11 pages.

Tableau.com [online], "Customize and Tune ODBC Connections: Version 2019.4," last updated Nov. 6, 2019, retrieved on Feb. 3, 2020, retrieved from URL<https://help.tableau.com/current/pro/desktop/en-us/odbc_customize.htm>, 15 pages.

Dogru et al., "A Graphical Data Flow Language for Retrieval, Analysis, and Visualization of a Scientific Database," Sep. 1996, 7(3): 247-265.

International Search Report and Written Opinion in International Appln. No. PCT/US2021/048993, dated Jan. 3, 2022, 15 pages.

Stonebraker et al., "Tioga: providing data management support for scientific visualization applications," Proceedings of the International Conference on Very Large Data Bases, Aug. 24, 1993, pp. 25-38.

* cited by examiner

TRANSFORMING OPERATIONS OF A COMPUTER PROGRAM FOR EXECUTION AT A DATABASE

TECHNICAL FIELD

This disclosure relates to techniques for transforming operations of a computer program for execution at a database.

BACKGROUND

Complex computations can often be expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, titled "Executing Computations Expressed as Graphs," the entire content of which in incorporated herein by reference. In some cases, the computations associated with a vertex can be expressed as a query to a data source. The query can be provided to the data source (e.g., a database) and a data processing system associated with the data source (e.g., a database management system) can return the data specified by the query.

SUMMARY

In general, in a first aspect, a method for transforming operations of a computer program for execution at a database includes: executing, by a data processing system, a program that specifies operations, with the program being written in a language, accessing a translation file that includes one or more instructions for translating the language of the program into a language of a database, the translation file specifying one or more operations in the language of the program that are supported by the database and further specifies the semantic meaning of the one or more supported operations in the language of the database, determining, from the translation file, one or more of the operations of the program that are unsupported by the database, processing, by the program, the one or more of the operations that are unsupported by the database, determining, from the translation file, one or more of the operations of the program that are supported by the database, and for the one or more of the operations that are supported by the database: translating, using the translation file, a portion of the program representing the one or more of the operations that are supported by the database into the language of the database; transmitting, to the database, the translated portion of the program; and receiving, by the program and from the database, data resulting from execution, within the database, of the translated portion of the program representing the one or more of the operations that are supported by the database.

In general, in a second aspect, combinable with the first aspect, the method includes performing, by the program, one or more additional operations on the data received from the database.

In general, in a third aspect, combinable with the first or second aspects, the method includes performing, by the program, one or more additional operations on data returned from the processing of the one or more of the operations that are unsupported by the database.

In general, in a fourth aspect, combinable with any of the first through third aspects, the program includes an executable dataflow graph having components representing the operations connected by links representing flows of data between the operations.

In general, in a fifth aspect, combinable with any of the first through fourth aspects, translating the portion of the program representing the one or more of the operations that are supported by the database includes generating one or more queries to the database in the language of the database for performing, within the database, the one or more of the operations.

In general, in a sixth aspect, combinable with any of the first through fifth aspects, at least one of the operations of the program includes a query operation, and the method includes removing, from the program, the one or more operations that are supported by the database and inserting, into the query operation, the one or more queries to the database in the language of the database.

In general, in a seventh aspect, combinable with any of the first through sixth aspects, determining the one or more of the operations that are supported by the database includes applying one or more pattern matching rules to the one or more operations in the translation file specified in the language of the program.

In general, in an eighth aspect, combinable with any of the first through seventh aspects, the semantic meaning accounts for at least one of a data type, a meaning of an operator, a meaning of a function, or an intended result of an operation, of the one or more supported operations in the language of the database.

In general, in a ninth aspect, combinable with any of the first through eighth aspects, the translation file is not encoded in the program.

In general, in a tenth aspect, combinable with any of the first through ninth aspects, the method includes receiving, from the program, an indication of the language of the database.

In general, in an eleventh aspect, combinable with any of the first through tenth aspects, the language of the program includes a data manipulation language (DML), and the language of the database includes a structured query language (SQL).

In general, in a twelfth aspect, combinable with any of the first through eleventh aspects, the translation file includes one or more instructions for translating the language of the program into a language of a plurality of databases including the language of the database.

In general, in thirteenth aspect, combinable with any of the first through twelfth aspects, a system includes one or more processors and one or more storage devices storing instructions which, when executed by the one or more processors, cause the one or more processors to perform operations including: executing, by a data processing system, a program that specifies operations, with the program being written in a language, accessing a translation file that includes one or more instructions for translating the language of the program into a language of a database, the translation file specifying one or more operations in the language of the program that are supported by the database and further specifies the semantic meaning of the one or more supported operations in the language of the database, determining, from the translation file, one or more of the operations of the program that are unsupported by the database, processing, by the program, the one or more of the operations that are unsupported by the database, determining, from the translation file, one or more of the operations of the program that are supported by the database, and for the one or more of the operations that are supported by the database: translating, using the translation file, a portion of the program representing the one or more of the operations that are supported by the database into the language of the database; transmitting, to the database, the translated portion of the program; and receiving, by the program and from the database, data resulting from execution, within the database, of the translated portion of the program representing the one or more of the operations that are supported by the database.

In general, in a fourteenth aspect, combinable with any of the first through thirteenth aspects, a non-transitory computer-readable storage medium stores instructions for causing a computing system to: execute, by a data processing system, a program that specifies operations, with the program being written in a language, access a translation file that includes one or more instructions for translating the language of the program into a language of a database, the translation file specifying one or more operations in the language of the program that are supported by the database and further specifies the semantic meaning of the one or more supported operations in the language of the database, determine, from the translation file, one or more of the operations of the program that are unsupported by the database, process, by the program, the one or more of the operations that are unsupported by the database, determine, from the translation file, one or more of the operations of the program that are supported by the database, and for the one or more of the operations that are supported by the database: translate, using the translation file, a portion of the program representing the one or more of the operations that are supported by the database into the language of the database; transmit, to the database, the translated portion of the program; and receive, by the program and from the database, data resulting from execution, within the database, of the translated portion of the program representing the one or more of the operations that are supported by the database.

In general, in a fifteenth aspect, combinable with any of the first through fourteenth aspects, a method includes: executing, by a data processing system, a computer program that specifies operations, with the computer program being written in a programming language, accessing a translation file that includes one or more instructions for translating the programming language of the computer program into a language of a database, the translation file specifying one or more operations in the language of the program that are supported by the database and further specifies the semantic meaning of the one or more supported operations in the language of the database, determining, from the translation file, one or more of the operations of the program that are supported by the database, and for the one or more of the operations that are supported by the database: translating, using the translation file, a portion of the program representing the one or more of the operations that are supported by the database into the language of the database; transmitting, to the database, the translated portion of the program; and receiving, by the program and from the database, data resulting from execution, within the database, of the translated portion of the program representing the one or more of the operations that are supported by the database.

In general, in a sixteenth aspect, combinable with any of the first through fifteenth aspects, the method includes determining, from the translation file, one or more of the operations of the program that are unsupported by the database and processing, by the computer program, the one or more of the operations that are unsupported by the database.

In general, in a seventeenth aspect, combinable with any of the first through sixteenth aspects, the computer program does not process the one or more of the operations of the program that are supported by the database.

In general, in an eighteenth aspect, combinable with any of the first through seventeenth aspects, the computer program only processes the one or more of the operations that are unsupported by the database.

In general, in a nineteenth aspect, combinable with any of the first through eighteenth aspects, the data processing system does not execute the portion of the computer program representing the one or more of the operations that are supported by the database.

One or more of the above implementations may provide one or more of the following advantages.

The techniques described here enable operations of a computer program (e.g., an executable dataflow graph) to be transformed for execution at a database (e.g., a relational database). In particular, the technology described here includes a translation file which specifies instructions for translating operations specified in the language of the program to the language of the database such that some or all of the operations of the program can be embedded in a query to the database. In this manner, the translation file facilitates "pushing down" the computational load of one or more operations from a data processing system executing the program to the database, thereby reducing the processing requirements at the data processing system and enabling more efficient use of computing resources overall.

Because databases may use a variety of different languages (e.g., SQL dialects) having different capabilities, an operation of the program supported by one database using a particular language may not be supported by another database using a different language. The translation file described here specifies which operations of program are supported by each language in a set of languages that can be used by the database. By doing so, the translation file allows a database to effectively "negotiate" with the system transforming the program regarding operations that are pushed down to the database. In other words, if the system determines, based on the translation file, that the language used by a database does not support a particular operation of the program, the system can decide not to push down the operation to the database 110 (or can reorder the computation steps or take another action). In addition, because the translation file is accessed at runtime, it can be extended to specify the operations supported by additional database languages or to update the operations supported by an existing database language, or both, without requiring modification to the underlying computer program. In this manner, the program can be reused and have its operations pushed down to virtually any database.

The translations specified in the translation file can also account for the semantic meaning of operations specified in the language of the program. By doing so, the accuracy of the translation is improved and translation of additional operations can be supported by, for example, allowing for translations even when there may not be an operation in the language of the database that corresponds or is equivalent to the operation specified in the language of the program.

By "pushing down" operations to one or more databases instead of performing the pushed down operations by a data processing system executing the program, built-in functionality of the databases can be efficiently used for any data processing system executing the program.

This Summary is provided to introduce a selection of concepts in a simplified form that are further described below in the Detailed Description. This Summary is not intended to identify key features or essential features of the claimed subject matter.

The details of one or more implementations are set forth in the accompanying drawings and the description below. Other features, objects, and advantages of the technology described here will be apparent from the description and drawings, and from the claims.

DETAILED DESCRIPTION

Figure 1:
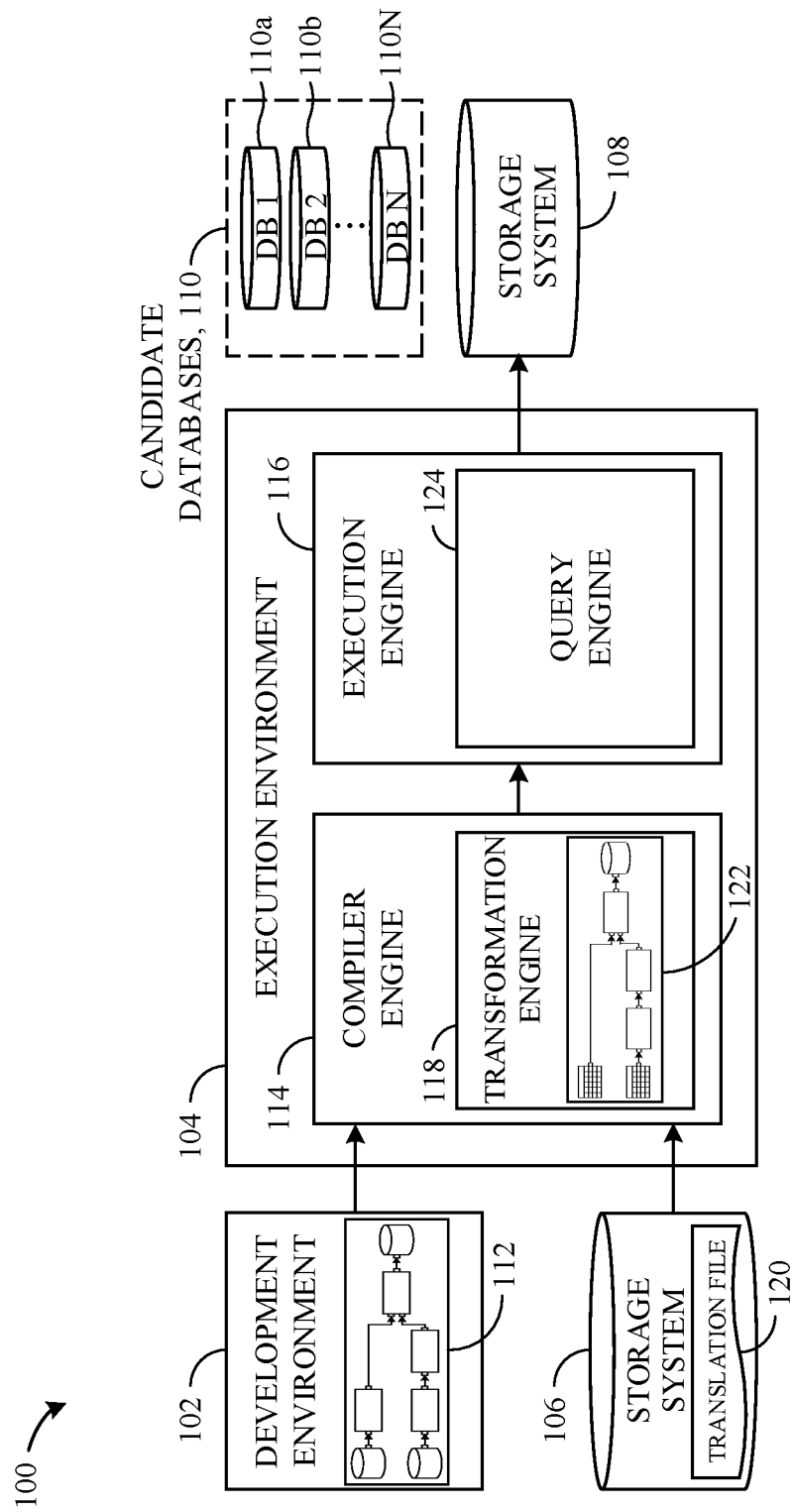
FIG. 1 is a block diagram of a system for transforming operations of a computer program for execution at a database.

FIG. 1 shows a system 100 for transforming operations of a computer program for execution at a database. The system 100 includes a development environment 102, an execution environment 104, storage systems 106, 108, and a plurality of candidate databases 110a, 110b, . . . , 110N (collectively referred to as "databases 110"). In general, the optional development environment 102 provides means for a user to create a computer program, such as a dataflow graph 112. For example, the development environment 102 provides a graphical development environment or other user interface that enables a user to specify computations or rules which can be expressed in the form of the dataflow graph 112. After generating the dataflow graph 112 configured to perform operations in accordance with the user's specification, the development environment 102 passes the dataflow graph 112 to the execution environment 104 for compilation and execution. In general, a dataflow graph described herein is an executable dataflow graph, and we sometimes use the terms "dataflow graph" and "executable dataflow graph" interchangeably. An executable dataflow graph has one or more components, and we sometimes use the term "component" interchangeably with "node" or "vertex." The nodes, components, or vertices correspond to program code, as also shown at the bottom of column 5 in the referenced U.S. Pat. No. 5,966,072. For example, a sort component corresponds to a particular program template. The same technique would be used for SQL commands. Each command may have one or more associated templates. As is evident from the abstract and columns 1-2, 5, 9-11 of the referenced U.S. Pat. No. 5,966,072, the skilled person appreciates that the executable dataflow graphs described herein are used to invoke computations directly.

The execution environment 104 includes a compiler engine 114 for compiling the dataflow graph 112 into an executable program (e.g., an executable dataflow graph) and an execution engine 116 for performing operations to execute the executable program. In operation, the compiler engine 114 receives data representing the dataflow graph 112 from the development environment 102 (or from another source, such as one of the storage systems 106, 108). In some cases, the compiler engine 114 determines that data (e.g., input data) to be processed by the executable version of dataflow graph 112 is stored on one or more of the databases 110, which can be relational databases. For example, an input component of the executable dataflow graph 112 may specify that the input data is stored on one or the databases 110.

In other words, a computer system 100 includes a development environment 102 coupled to a data storage, such as storage system 106, wherein the development environment 102 is configured to build a data processing application that is associated with an executable dataflow graph 112 that implements a graph-based computation performed on data flowing from one or more input data sets through a graph of processing graph components to one or more output data sets, wherein the dataflow graph 112 is specified by data structures in the data storage, the dataflow graph 112 having a plurality of components being specified by the data structures and representing the graph components connected by one or more links, the links being specified by the data structures and representing data flows between the graph components; an execution environment 104 coupled to a storage system 106 and being hosted on one or more computers, the execution environment 104 including a compiler engine 114 configured to read the stored data structures specifying the dataflow graph 112 and to allocate and configure computing resources such as processes for performing the computation of the graph components that are assigned to the data flow graph by the compiler engine 114; the execution environment 104 including an execution engine 116 to schedule and control execution of the assigned processes for performing operations to execute the executable program.

In the above and other cases, the compiler engine 114 invokes a transformation engine 118 configured to transform some or all of the operations of the dataflow graph 112 such that the operations can be performed by one or more of the databases 110 (or a data processing system associated with a respective database). For example, the transformation engine 118 generates a query (e.g., a SQL query) to a database 110 which, when executed at the database, causes the database to carry out one or more operations of the dataflow graph 112 and return the results. The query is then inserted into the dataflow graph 112 in place of the one or more operations to produce a transformed dataflow graph 122, effectively "pushing down" the computational load of the one or more operations from the execution environment 104 to the database 110.

To translate some or all of the operations of the dataflow graph 112 into instructions executable by the databases 110, the transformation engine 118 is configured to receive a translation file 120 stored in the storage system 106. In general, the translation file 120 includes instructions for translating operations defined in a language of the dataflow graph 112 into a language of a database 110. For example, the dataflow graph 112 defines operations in a language, such as a data manipulation language (DML). On the other hand, the database 110 is configured to interpret instructions (e.g., a query) in a different language, such as SQL or a dialect thereof (e.g., DB2, PostgreSQL, Oracle, etc.). Accordingly, the transformation engine 118 uses the translation file 120 to translate one or more operations defined in the language of the dataflow graph 112 into a query that is interpretable by a respective database 110.

Because the databases 110 may use a variety of different languages (e.g., SQL dialects) having different capabilities, an operation of the executable dataflow graph 112 supported by one database 110 using a particular language may not be supported by another database 110 using a different language. Accordingly, the translation file 120 specifies which operations of a dataflow graph 112 are supported by each language in a set of languages that can be used by the database 110. By doing so, the translation file 120 allows a database 110 to effectively "negotiate" with the transformation engine 118 regarding operations that are pushed down to the database 110. In other words, if the transformation engine 118 determines, based on the translation file 120, that the language used by a database 110 does not support a particular operation of the dataflow graph 112, the transformation engine 118 can decide not to push down the operation to the database 110 (or can reorder the computation steps or take another action, as described below). In addition, because the translation file 120 is accessed at runtime, it can be extended to specify the operations supported by additional database languages or to update the operations supported by an existing database language, or both, without requiring modification to the underlying dataflow graph 112. In this manner, the dataflow graph 112 can be reused, and the transformation engine 118 can push its operations down, to virtually any database 110. Additional details on the extensibility of the translation file 120 is described below with reference to FIG. 5.

In an example, an operation of a computer program, such as an executable dataflow graph, is "supported" by a database (or database language) if the operation can be expressed in the database language such that the operation (or an equivalent operation) can be carried out by the database (or the database management system). In an example, an operation of a computer program (e.g., an executable dataflow graph) is "unsupported" by a database (or database language) if the operation cannot be expressed in the database language, or the operation (or an equivalent operation) cannot be carried out by the database (or the database management system), or both. In an example, whether an operation of a computer program is supported by a particular database (or database language) is determined using the translation file 120.

In some examples, the translations specified in the translation file 120 account for the semantic meaning of operations specified in the language of the dataflow graph 112. We use the term "semantic meaning" in this context to refer to translations that go beyond simple one-to-one translations from one language to another without associating meaning with the translation. For example, the translations specified in the translation file 120 can account for data type (e.g., type sensitivity), a meaning of an operator or function, an intended result of an operation, or combinations of them, among other translations that associate meaning or go beyond mere syntactical conversions. By accounting for the semantic meaning of operations specified in the language of the dataflow graph 112 when translating the operations to the language of the database 110, the accuracy of the translation is improved and translation of additional operations can be supported (e.g., by allowing for translations even when there may not be an operation in the language of the database 110 that corresponds or is equivalent to the operation specified in the language of the dataflow graph 112).

After transforming some or all of the operations of the dataflow graph 112 into queries to one or more of the databases 110, the transformation engine 118 passes the transformed dataflow graph 122 to the compiler engine 114 for compilation. The compiler engine 114 compiles the transformed dataflow graph 122 into an executable program and transmits the executable program to the execution engine 116. The execution engine 116 carries out operations to execute the executable program and stores the results in the storage system 108, which may be the same or different from the storage system 106. To execute the executable program, the execution engine 116 invokes a query engine 124 to carry out operations specified by a portion of the program associated with the translated portion of the dataflow graph. In doing so, the query engine 124 is caused to transmit the queries generated by the transformation engine 118 to the appropriate databases 110. The databases 110 (or a data processing system associated with a respective database, such as a database management system (DBMS)) execute each query received from the query engine 124 and return the resulting data. The query engine 124 provides the data received from the databases 110 to the execution engine 116, and the execution engine 116 carries out operations to process the data in accordance with a portion of the program associated with the untranslated portion of the dataflow graph.

Figure 2A:
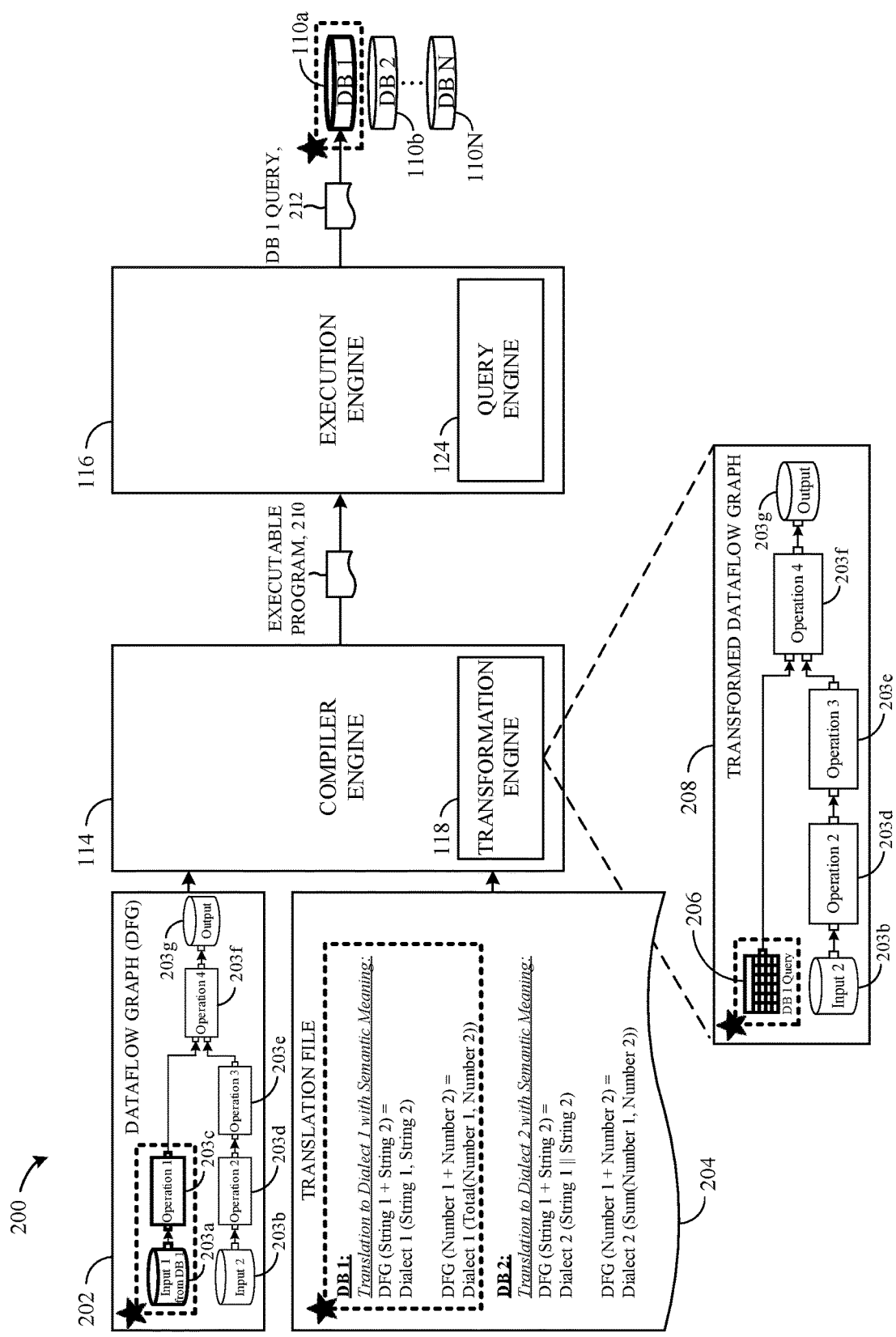
FIGS. 2A and 2B are block diagrams of examples of transforming operations of a computer program for execution at a database.

Referring to FIG. 2A, a system 200 shows an example of transforming operations of a computer program for execution at a database. In this example, a dataflow graph 202 is provided to the compiler engine 114 for compiling. The dataflow graph 202 includes input components 203a, 203b representing data inputs, operation components 203c, 203d, 203e, 203f representing operations to be performed on the data inputs or data flowing from another operation component, and an output component 203g representing an output destination (e.g., write destination) for the processed data. In this example, input component 203a represents a data input from a database 110a ("DB 1"), which is a relational database. On the other hand, input component 203b represents a data input that is not stored in a relational database or otherwise cannot be queried.

The compiler engine 114 invokes the transformation engine 118 to generate a query to the relational database 110a for accessing the data specified by the input component 203a. The transformation engine 118 also determines whether "Operation 1" (or a portion thereof) represented by component 203c can be pushed down to the database 110a via the query. To do so, the transformation engine 118 first determines that the language used by the database 110a is "Dialect 1." This information is obtained from, for example, the input component 203a or a file associated with the input component 203a. The transformation engine 118 then reads a translation file 204 to determine whether "Operation 1" represented by component 203c can be translated from the language of the dataflow graph 202 to "Dialect 1," the language used by the database 110a.

Assume, for example, that the input data represented by input component 203a includes separate records for the first and last names of customers, and "Operation 1" represented by component 203c works to combine the first and last names of customers into a single string through the expression "First+Last" in the language of the dataflow graph 202. By comparing the expression for "Operation 1" specified in the language of the dataflow graph 202 with the translation file 204 (e.g., using pattern matching techniques, as described below), the transformation engine 118 determines that the expression can be translated to the "Dialect 1" language. In addition, because the translation file 204 accounts for the semantic meaning of the expression in the translation from the language of the dataflow graph 202 to the language of the database 110a, the transformation engine 118 ascertains that the expression "First+Last" should be translated to "First, Last" in the "Dialect 1" language (rather than, for example, Total(First, Last), which is meant for numeric inputs).

After translating "Operation 1" from the language of the dataflow graph 202 to the language of the database 110a, the transformation engine 118 generates a query to the database 110a to access the specified input data and perform the translated operation. The transformation engine 118 replaces the input component 203a and the component 203c in the dataflow graph 202 with a query component 206 to produce a transformed dataflow graph 208. The transformation engine 118 then passes the transformed dataflow graph 208 to the compiler engine 114 for compilation. The compiler engine 114 compiles the transformed dataflow graph 208 into an executable program 210 and transmits the program 210 to the execution engine 116 (or to a storage system for storage). The execution engine 116 carries out operations to execute the executable program 210, including invoking the query engine 124 to transmit a query 212 to the database 110a as specified by a portion of the program 210 associated with the query component 206. The database 110a executes the query 212 and returns the resulting data to the query engine 124. The query engine 124 provides the received data to the execution engine 116, and the execution engine 116 carries out operations to process the data in accordance with a portion of the program 210 associated with the untranslated portion of the dataflow graph (e.g., components 203b, 203d, 203e, 203f, and 203g).

Figure 2B:
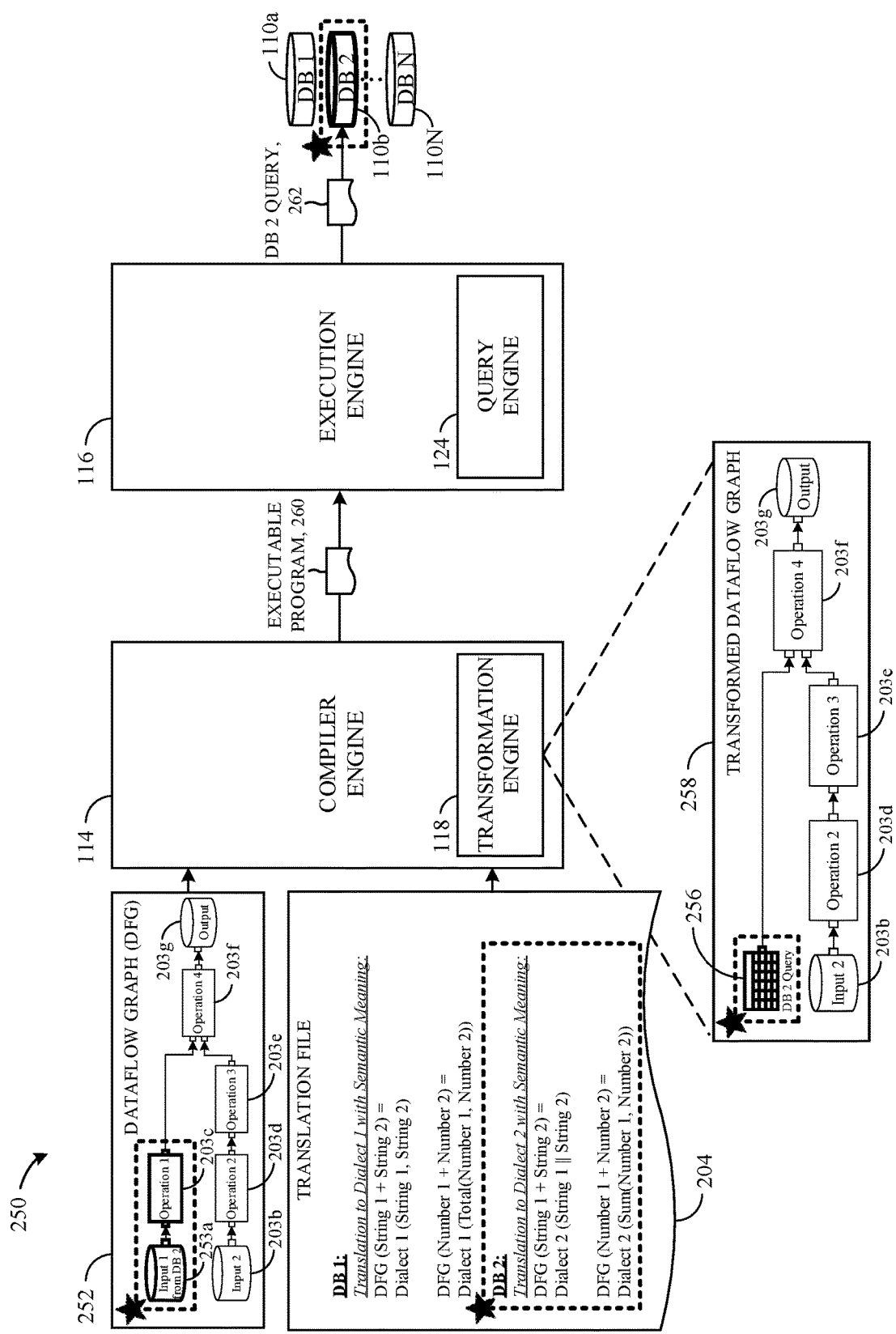

Referring to FIG. 2B, a system 250 shows another example of transforming operations of a computer program for execution at a database. In this example, a dataflow graph 252 is provided to the compiler engine 114 for compiling. The dataflow graph 252 is the same as the dataflow graph 202 shown in FIG. 2A, except that input data is now received from database 110b ("DB 2") as shown by input component 253a. Much like the database 110a, the database 110b is a relational database. However, the database 110b uses a different language ("Dialect 2") relative to the database 110a.

In this example, the compiler engine 114 invokes the transformation engine 118 to generate a query to the relational database 110b for accessing the data specified by the input component 253a. The transformation engine 118 also reads the translation file 204 to determine whether "Operation 1" represented by component 203c can be translated from the language of the dataflow graph 252 to "Dialect 2," the language used by the database 110b. Assume, as in the previous example, that "Operation 1" represented by component 203c works to combine the first and last names of customers into a single string through the expression "First+Last" in the language of the dataflow graph 252. By comparing the expression for "Operation 1" in the language of the dataflow graph 252 with the supported operations for "Dialect 2" specified in translation file 204, the transformation engine 118 determines that the expression can be translated to the "Dialect 2" language. In addition, because the translation file 204 accounts for the semantic meaning of the expression in the translation from the language of the dataflow graph 252 to the language of the database 110b, the transformation engine 118 ascertains that the expression "First+Last" should be translated to "First+Last" in the "Dialect 2" language (rather than, for example, Sum(First, Last), which is meant for numeric inputs).

After translating "Operation 1" from the language of the dataflow graph 252 to the language of the database 110b, the transformation engine 118 generates a query to the database 110b to access the specified input data and perform the translated operation. The transformation engine 118 replaces the input component 253a and the component 203c in the dataflow graph 252 with a query component 256 to produce a transformed dataflow graph 258. The transformation engine 118 then passes the transformed dataflow graph 258 to the compiler engine 114 which compiles the transformed dataflow graph 258 into an executable program 260 and transmits the program 260 to the execution engine 116. The execution engine 116 carries out operations to execute the executable program 260 as described above, including invoking the query engine 124 to transmit a query 262 to the database 110b as specified by a portion of the program 260 associated with the query component 256. As shown from the examples in FIGS. 2A and 2B, the techniques described here allow the same dataflow graph to be optimized and run on different databases using different languages without requiring modification to the underlying dataflow graph.

Figure 3A:
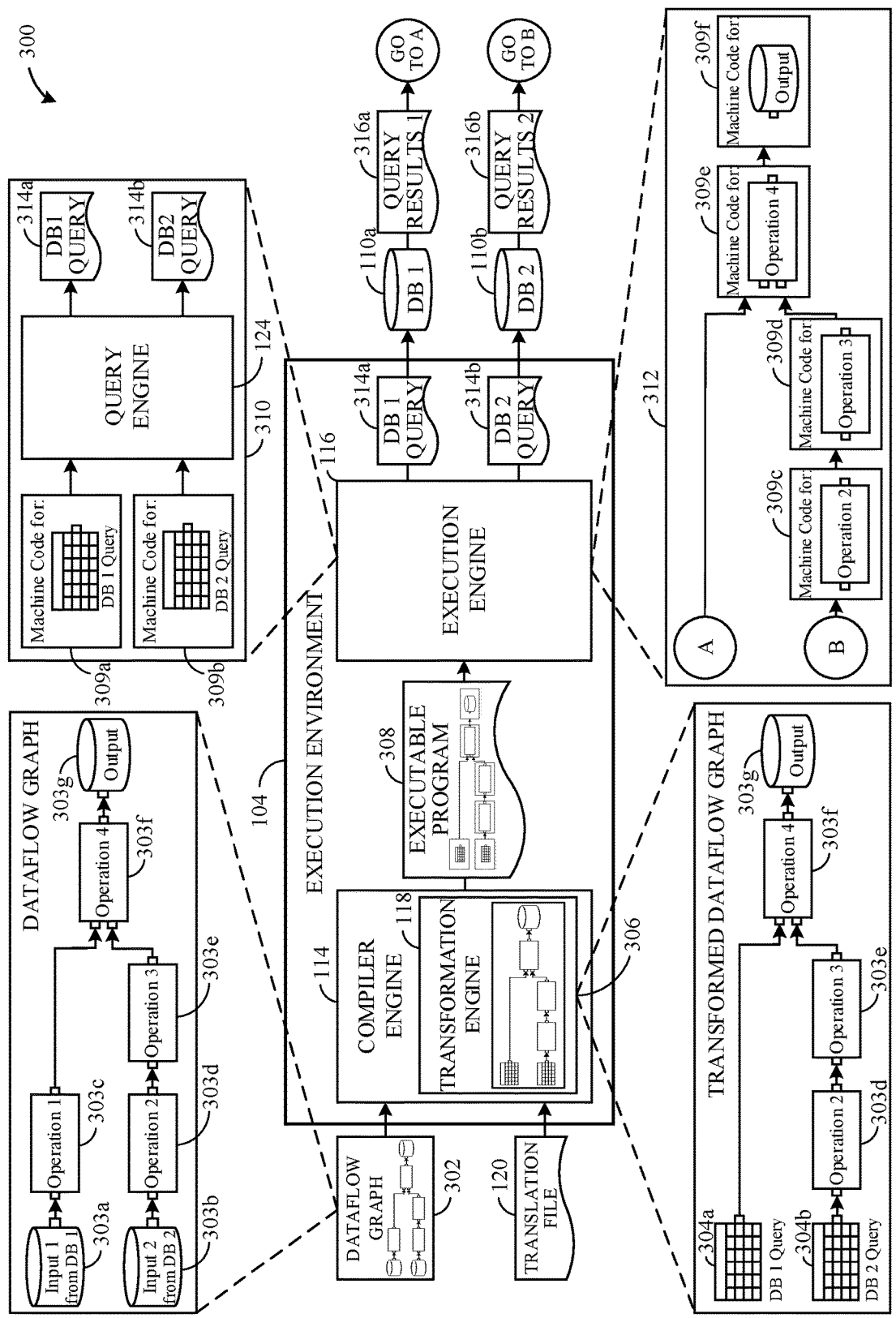
FIGS. 3A to 3C are block diagrams showing additional details of a system for transforming operations of a computer program for execution at a database.

Referring to FIG. 3A, a system 300 shows additional details of the system 100. In this example, the compiler engine 114 of the execution environment 104 receives a dataflow graph 302 (e.g., from the development environment 102, from the storage system 106 or 108). The dataflow graph 302 includes input components 303a, 303b representing data inputs, operation components 303c, 303d, 303e, 303f representing operations to be performed on the data inputs or data flowing from another operation component, and an output component 303g representing an output destination for the processed data. In this example, the input component 303a represents a data input from a database 110a ("DB 1") and the input component 303b represents a data input from a database 110b ("DB 2"), both of which are relational databases.

Because the dataflow graph 302 is configured to access data from relational databases, the compiler engine 114 invokes the transformation engine 118 to generate a query to each of the relational databases 110a, 110b for accessing the data specified by the input components 303a, 303b. The transformation engine 118 also reads the translation file 120 to determine whether some or all of the operations of the dataflow graph 302 (e.g., the operations (or portions thereof) represented by components 303c, 303d, 303e, 303f) can be translated to the language of one or the databases. In this example, the transformation engine 118 is able to translate at least "Operation 1" represented by component 303c to the language of the database 110a. Additional details on the process for translating the operations of the dataflow graph are described below with reference to FIGS. 3D-3P.

After translating some or all of the operations from the language of the dataflow graph 302 to the language of one of the databases 110a, 110b, the transformation engine 118 generates one or more queries to the databases 110a, 110b to access the specified input data and perform the translated operations (if any). In this example, the transformation engine 118 replaces the input component 303a and the component 303c in the dataflow graph 302 with a query component 304a in a transformed dataflow graph 306. The transformation engine 118 also replaces the input component 303*b* with a query component 304*b* in the transformed dataflow graph 306.

The transformation engine 118 then passes the transformed dataflow graph 306 to the compiler engine 114 which compiles the transformed dataflow graph 306 into an executable program 308 and transmits the program 308 to the execution engine 116. The execution engine 116 then carries out operations to execute the executable program 308. In general, execution of the program 308 includes a remote execution process 310 and a local execution process 312 which may occur in series or in parallel depending on the implementation or the dataflow graph 302, or both. During the remote execution process 310, the execution engine 116 executes a portion of the program 308 associated with the translated portion of the dataflow graph. In particular, the execution engine 116 executes a portion of the program 308 including machine code 309*a*, 309*b* representing instructions for the queries to the databases 110*a*, 110*b*. In doing so, the execution engine 116 causes the query engine 124 to transmit queries 314*a*, 314*b* (e.g., as defined in the generated query components 304*a*, 304*b*) to the databases 110*a*, 110*b*. Each of the databases 110*a*, 110*b* executes the respective query 314*a*, 314*b* to produce query results 316*a*, 316*b*, and the query results 316*a*, 316*b* are returned to the query engine 124 (or the execution engine 116, or both).

In this example, the execution engine 116 uses the query results 316*a*, 316*b* as input data for the local execution process 312. During the local execution process 312, the execution engine 116 executes a portion of the program 308 associated with the untranslated portion of the dataflow graph. Specifically, the execution engine 116 executes a portion of the program 308 including machine code 309*c*, 309*d*, 309*e*, 309*f* representing operations of the dataflow graph that were not translated or pushed down to the databases 110. The data resulting from execution of the program 310 can be stored, displayed to a user, or both, among others.

Figure 3B:
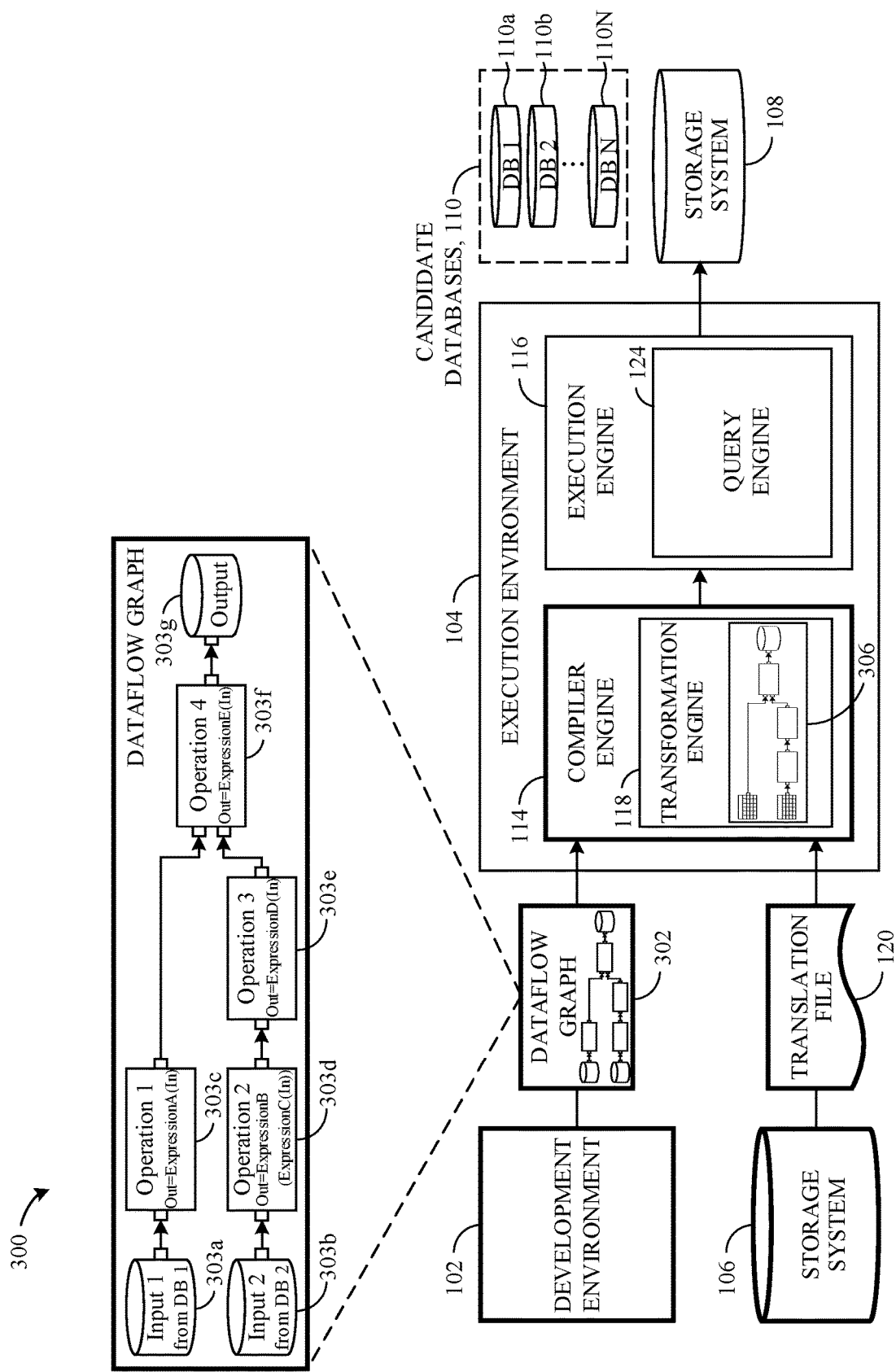
Figure 3C:
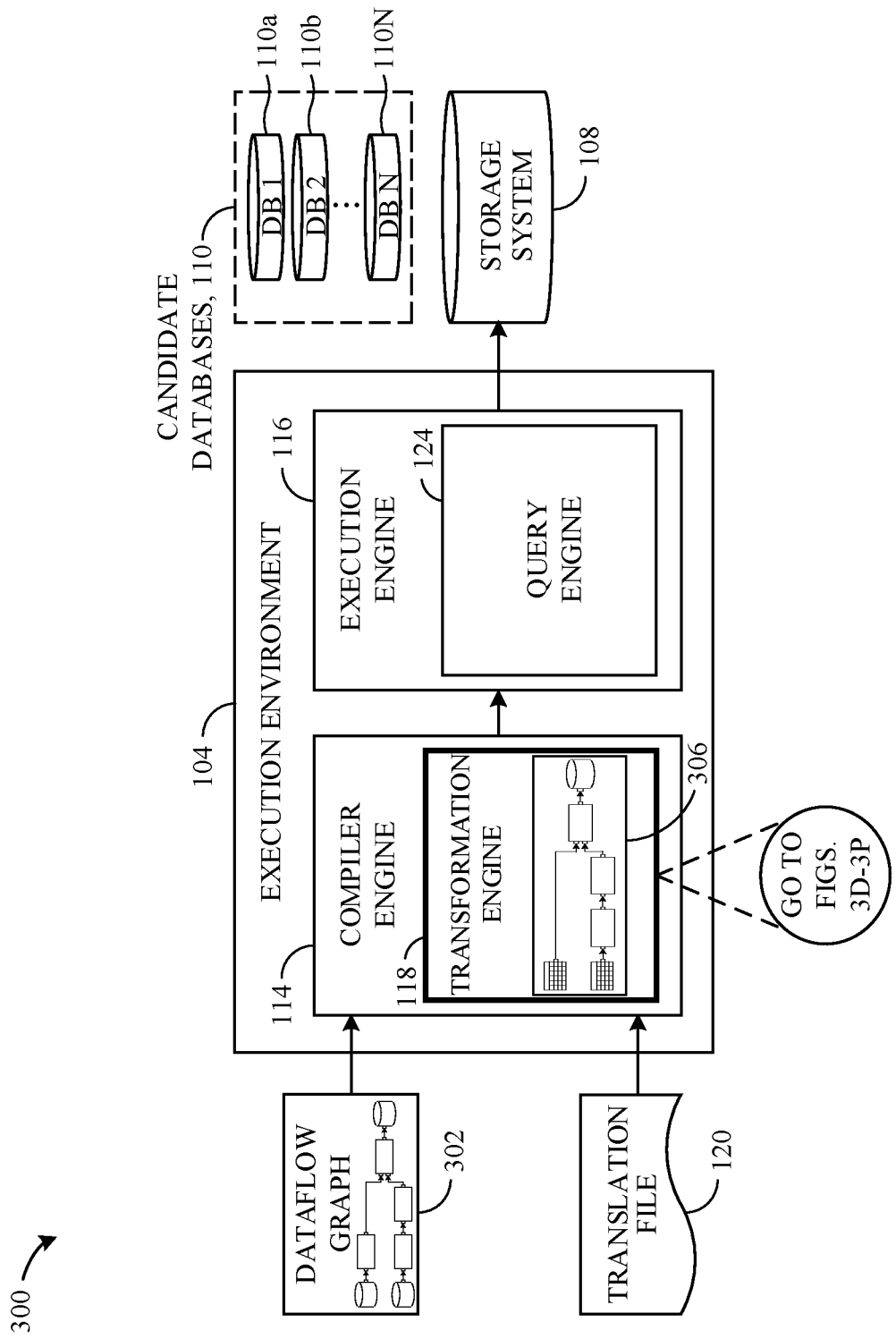
Figure 3D:
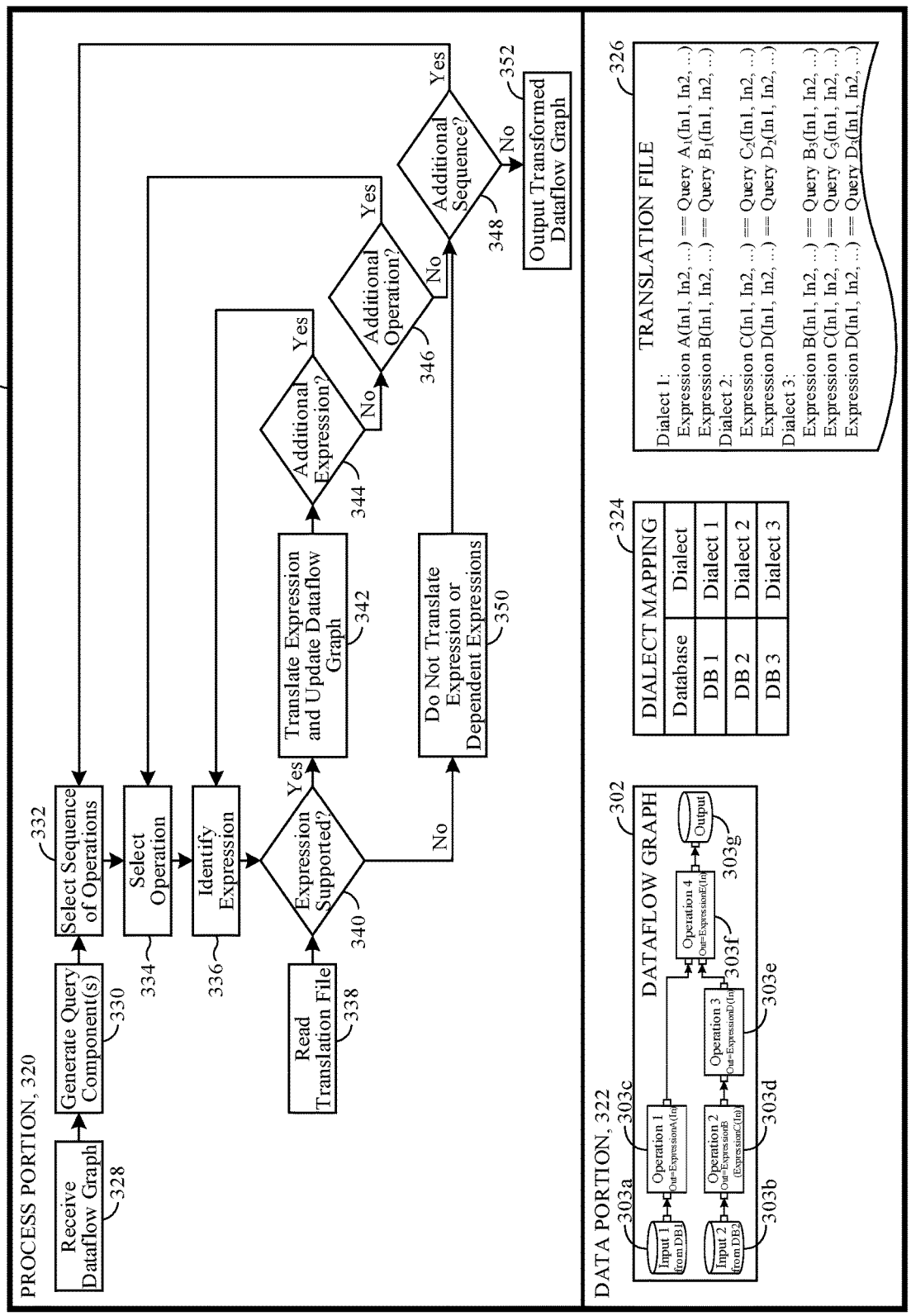
FIGS. 3D to 3P are block diagrams showing additional details of a transformation engine.

FIGS. 3B and 3C show additional details of the system 300 for transforming operations of a computer program for execution at a database. In this example, the development environment 102 provides the dataflow graph 302 to the compiler engine 114 for compiling. The dataflow graph 302 includes input components 303*a*, 303*b* representing data inputs, operation components 303*c*, 303*d*, 303*e*, 303*f* representing operations to be performed on the data inputs or data flowing from another operation component, and an output component 303*g* representing an output destination for the processed data. In general, the components 303*c*, 303*d*, 303*e*, 303*f* specify a variety of operations to be performed on data flowing through the dataflow graph 302, including filter operations, aggregation operations (e.g., count, sum, min, max, average, etc.), and join operations, among others. In an example, each operation includes one or more expressions that define the overall operation. In some cases, the expressions are nested, such as in the operation represented by component 303*d*. The terms "operation" and "expression" are sometimes used interchangeably in the present disclosure, although we note that expressions have more granularity than operations in some examples.

The techniques described here can be used to translate some or all of the operations (or portions of an operation, such as one or more expressions that make up the operation) from the language of the dataflow graph 302 to the language of a database 110. In particular, the transformation engine 118 leverages the translation file 120 to translate operations (or portions thereof) from the language of the dataflow graph 302 to the language of the database 110 in a way that is consistent with the semantic meaning of the operation. In some examples, the operations are translated to a query in the language of the database 110 which is inserted into the dataflow graph 302 in place of the translated operations, allowing the operations to effectively be pushed down to the database. Additional details on the translation file 120 are provided as follows:

A translation file (sometimes referred to as a "dialect file") contains a sequence of database language specifications (e.g., SQL dialect specifications), such as:
   sql dialect "default" { ... }
   sql dialect "db2" { ... }
   sql dialect "db2eee" { ... }

Each input data source in a dataflow graph specifies a database name (or DBMS name) or includes a file which provides database name. This information can be used by the system to look-up or otherwise obtain the database language or dialect. In an example, the "default" SQL dialect is used if no other dialect is found to be match for the database name.

Dialect Inheritance:

In an example, a dialect may specify a base dialect, and may then override some of its parameters or rules:
   sql dialect "greenplum" {base dialect="postgresql";}
   sql dialect "db2eee" {base dialect="db2";}

If no base dialect is specified then the "default" dialect can be used as a base.

Dialect Rules:

In an example, the SQL dialect specification includes a plurality of pattern matching rules which embody the semantic meaning of the expression. In general, pattern matching is the act of checking a given expression or sequence of expressions for the presence of the constituents of some pattern according to rules (e.g., pattern matching rules). These rules can have the form:
   sql ( ... )=dml ( ... );

In an example, the DML expression is a function invocation or unary or binary operator:
   sql (a*b)=dml (a*b);
   sql (ABS(num))=dml (math_abs(num));

In an example, the arguments to the function or operator may be symbol names, as above, or constants:
   sql (SIGN(num))=dml (compare(num, 0)); Symbols can match whatever sub-expression appears in the position in the actual DML.

Constants can match if the sub-expression can be statically evaluated as equal to that constant, so the form of the constant is not critical in some examples. For example, the DML expression compare(foo, (int)0) matches the pattern above in some examples.

In an example, patterns are matched in the order they appear, so a more-specific pattern can be combined with a general pattern:
   sql (TRUNC(num))=dml (decimal_truncate(num, 0));
   sql (TRUNC(num, num_places)=dml (decimal_truncate (num, num_places));

If no pattern matches a particular DML expression, then it can be determined that the dialect does not support such an expression. As such, the expression may not be translated or pushed down.

On the DML side of a rule, the text is parsed as a DML expression, and matching occurs against a parsed DML expression. In an example, if the actual DML has key-value arguments, those are bound first and turned positional for the purposes of matching.

On the SQL side of a rule, the text is tokenized using a SQL tokenizer which understands keywords from all common SQL dialects. Any non-keyword symbol which matches a name used in the DML side of a rule will be rewritten to whatever that name bound to when the pattern matched.

Dialect Parameters:

In addition to the base dialect, a dialect may specify several other parameters to control the generation of SQL. For example, one or more parameters may be used to control: the generation of GROUP BY and ORDER BY clauses for nullable columns, how string concatenation is rendered, pushdown of record limit operations, the number of characters allowed in a column or table alias, the pushdown of joins where none of the inputs are required, or combinations of them, among others.

Referring to FIGS. 3D to 3P, additional details of the transformation engine 118 are shown. For purposes of explanation, the transformation engine 118 is illustrated as including a process portion 320 and a data portion 322. In this example, the process portion 320 includes a flowchart of operations carried out by the transformation 118 to transform operations of a dataflow graph 302 for execution at a database 110. The data portion 322 includes a dataflow graph 302, a dialect mapping 324 specifying a series of databases and their corresponding dialects, and a translation file 326.

Figure 3E:
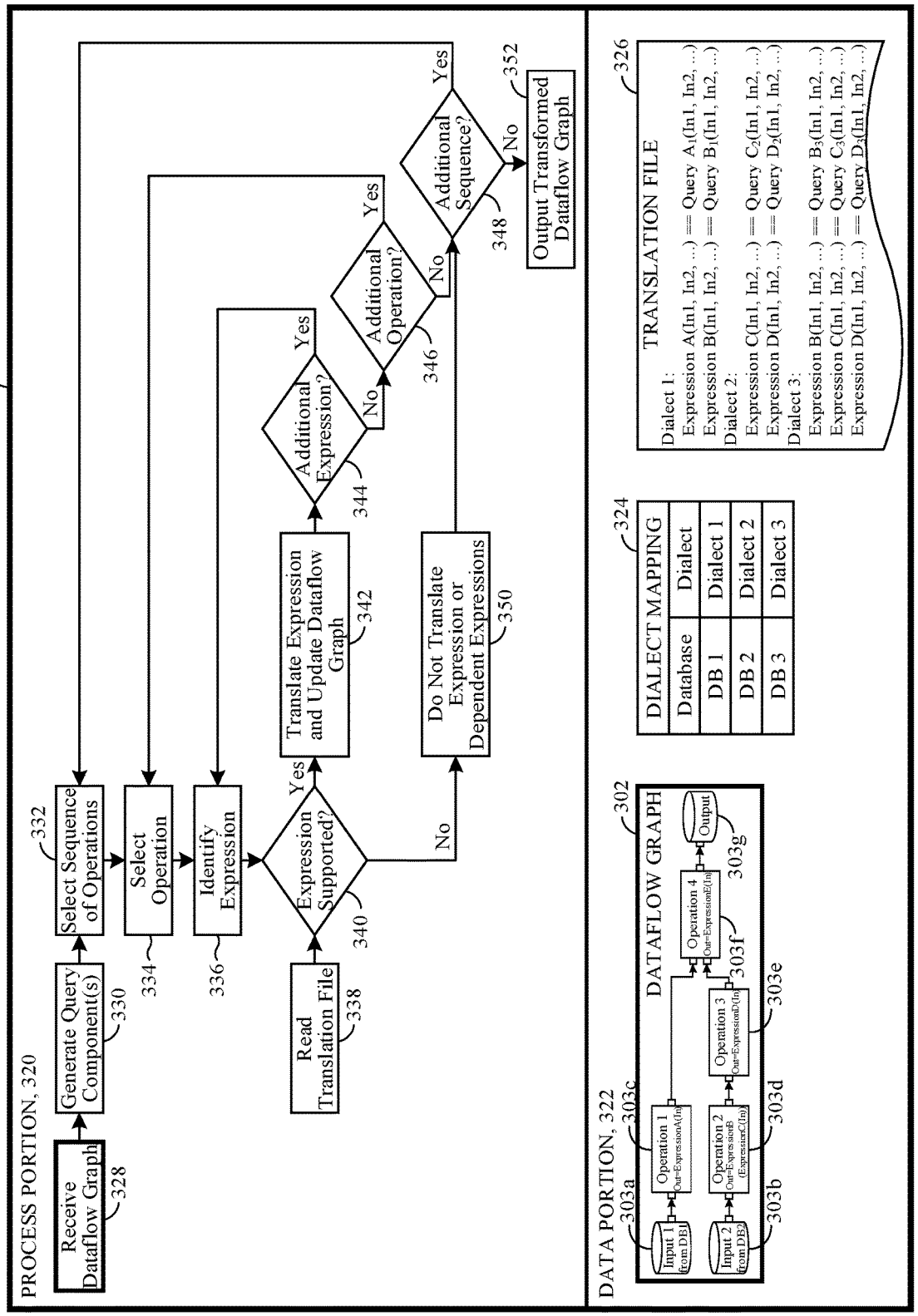
Figure 3F:
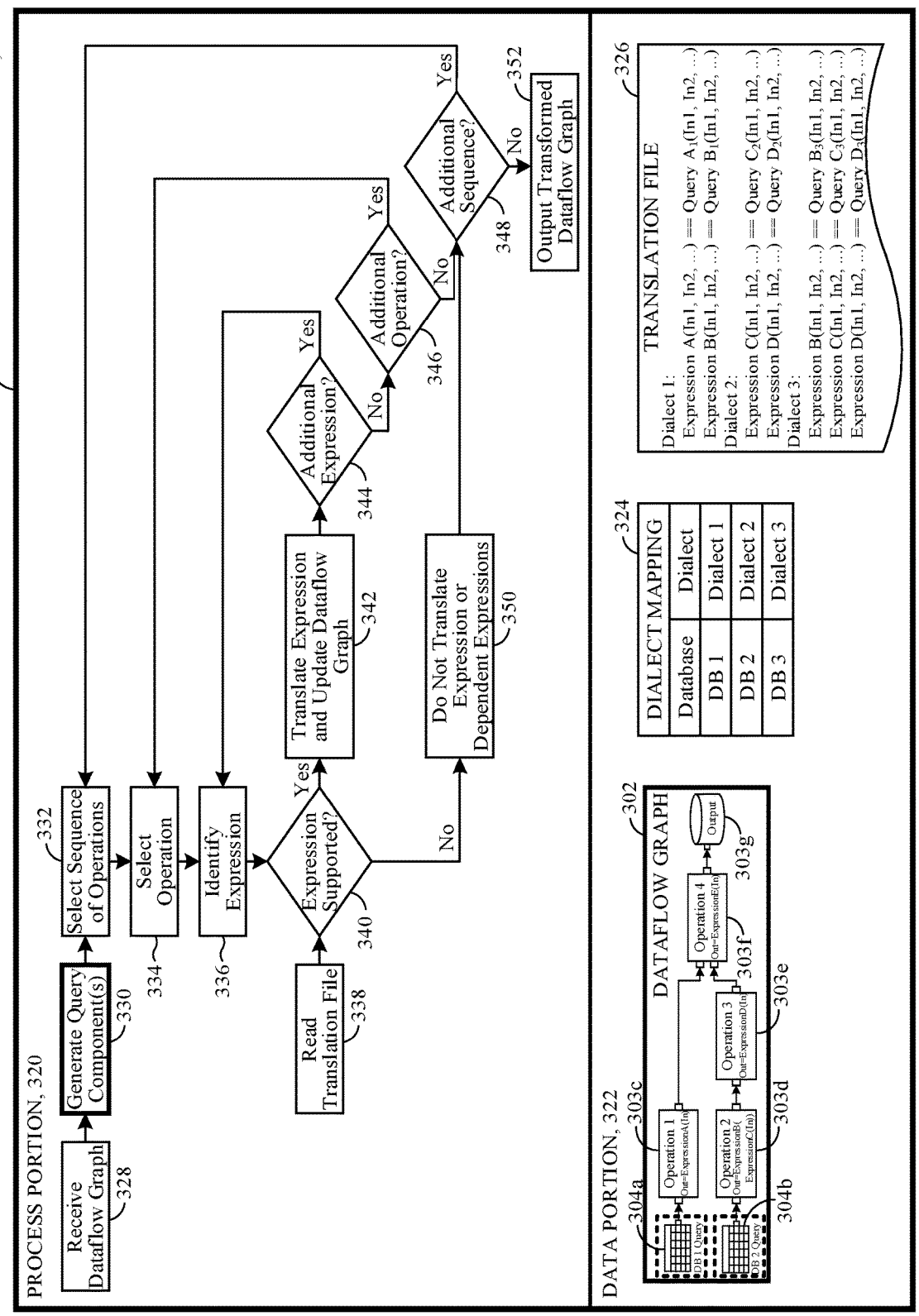

In this example, the process shown in the process portion 320 begins with the transformation engine 118 receiving (328) the dataflow graph 302 (FIG. 3E). For example, the transformation engine 118 receives the dataflow graph 302 from a development environment 102 or storage system 106, 108 via the compiler engine 114. Next, the transformation engine generates (330) query components 304a, 304b for the input components 303a, 303b that access data from a relational database (FIG. 3F). The query components 304a, 304b include a query in the language of the database (e.g., a SELECT statement) to retrieve data specified by the input components 303a, 303b from the database 110. As shown in the data portion 322, the generated query components 304a, 304b replace the input components 303a, 303b in the dataflow graph 302.

Figure 3G:
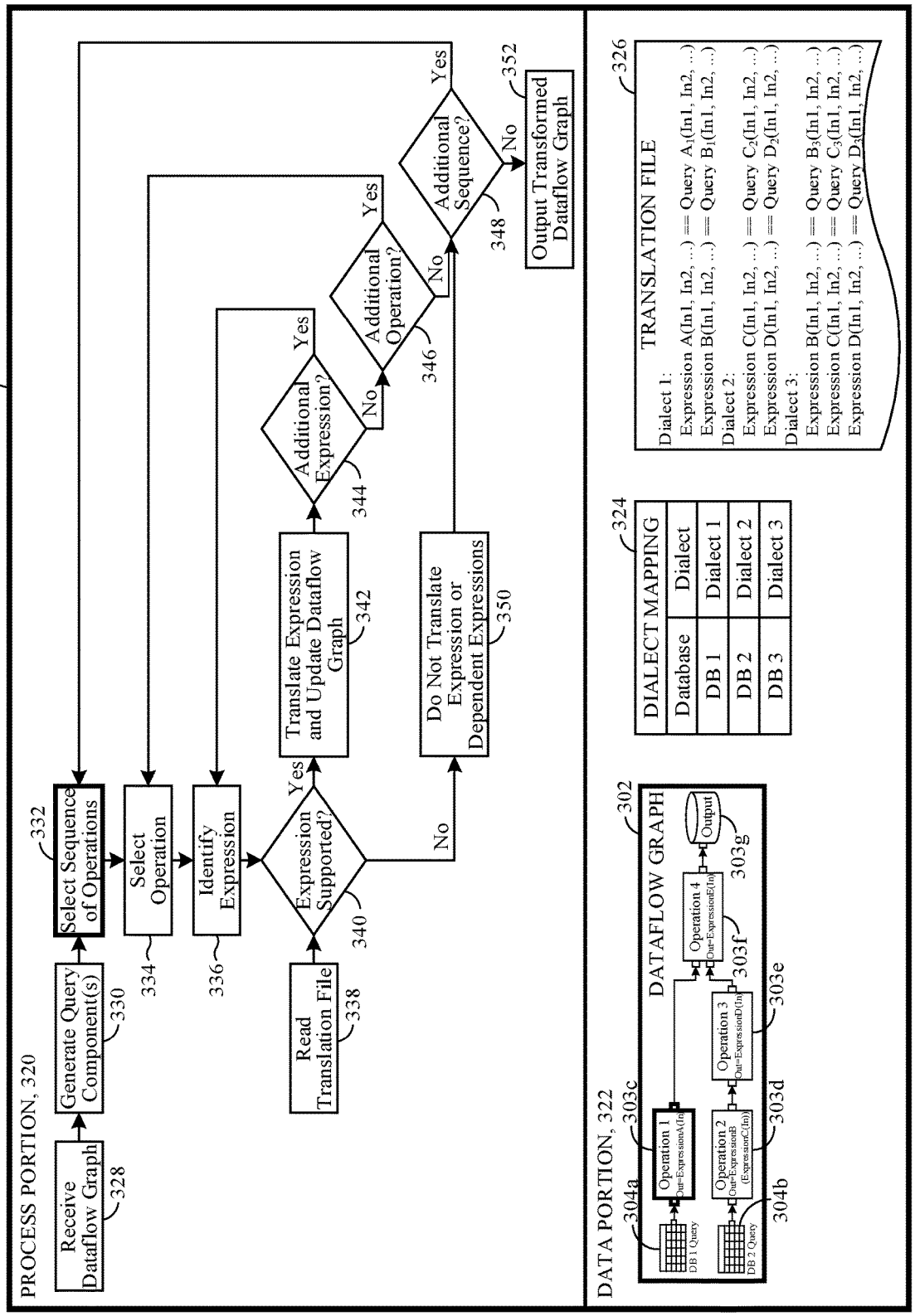
Figure 3H:
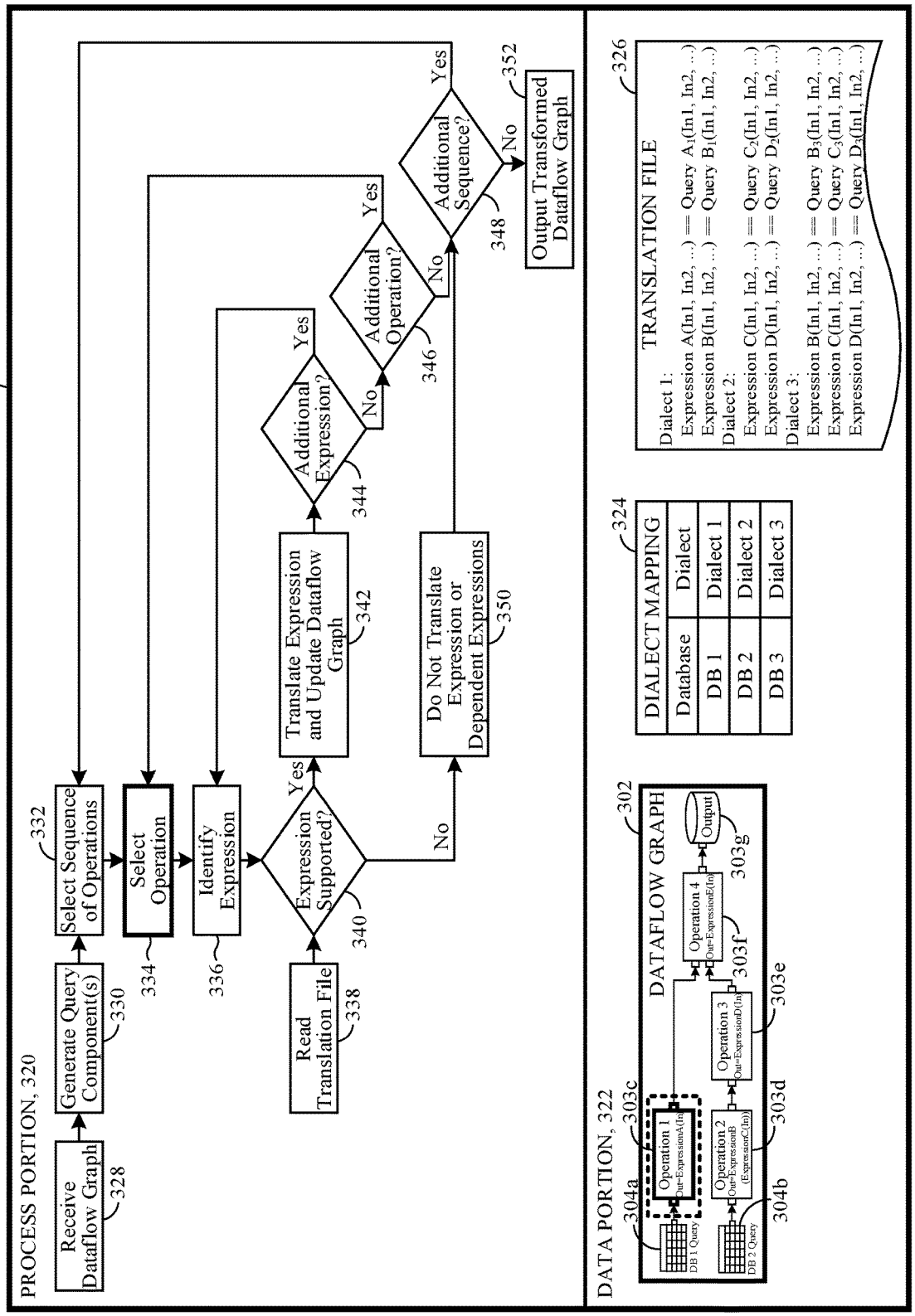

The transformation engine 118 selects (332) an independent operation or sequence of operations in the dataflow graph 302 to consider for translation (FIG. 3G). In an example, the transformation engine 118 processes the dataflow graph 302 in a topological order and therefore considers operations and sequences of operations from left to right. Next, the transformation engine 118 selects (334) an operation to consider for translation (FIG. 3H). Because the selection at step 332 resulted in a single operation ("Operation 1" represented by component 303c), the transformation engine 118 selects that operation for consideration here.

Figure 3I:
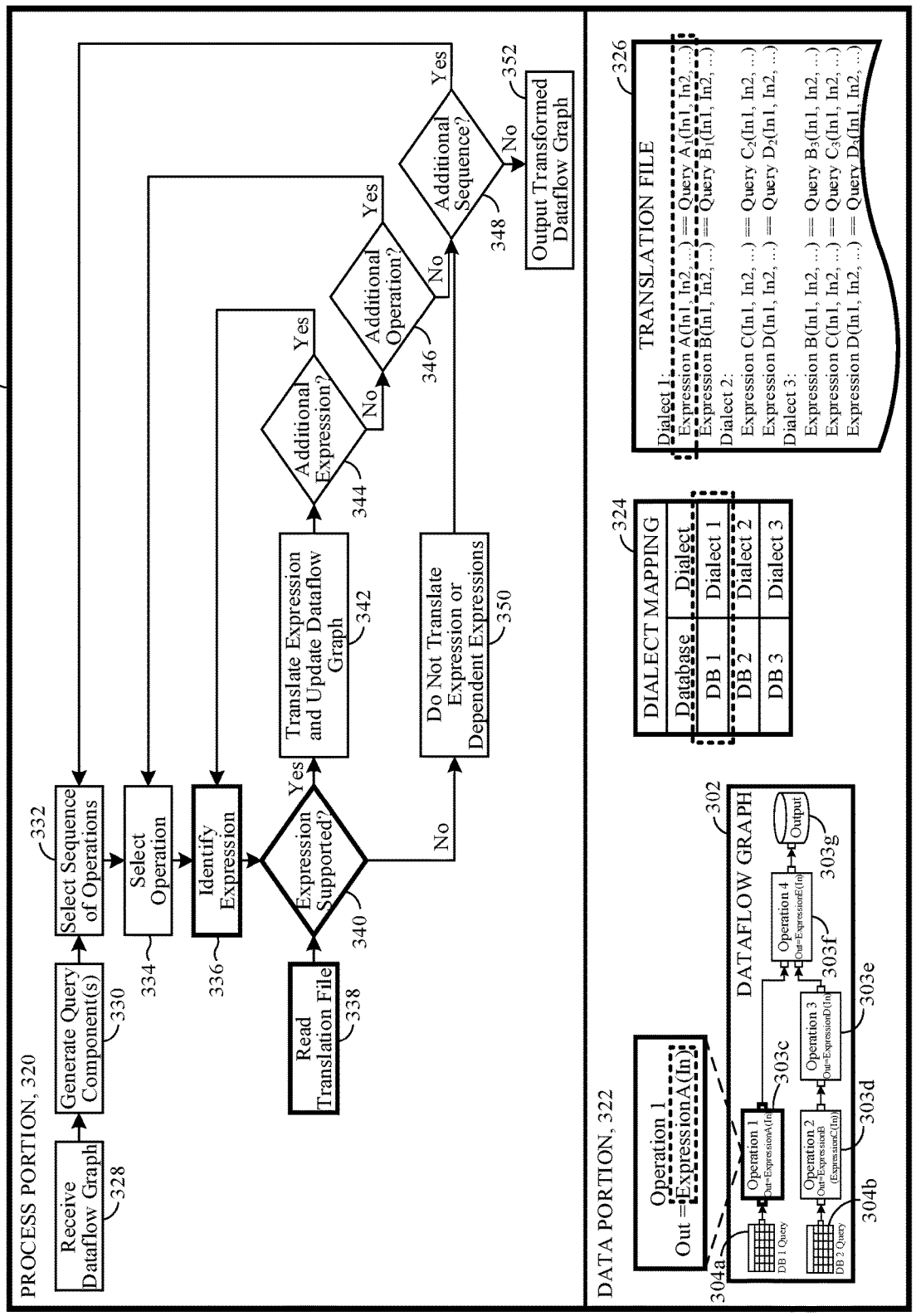
Figure 3J:
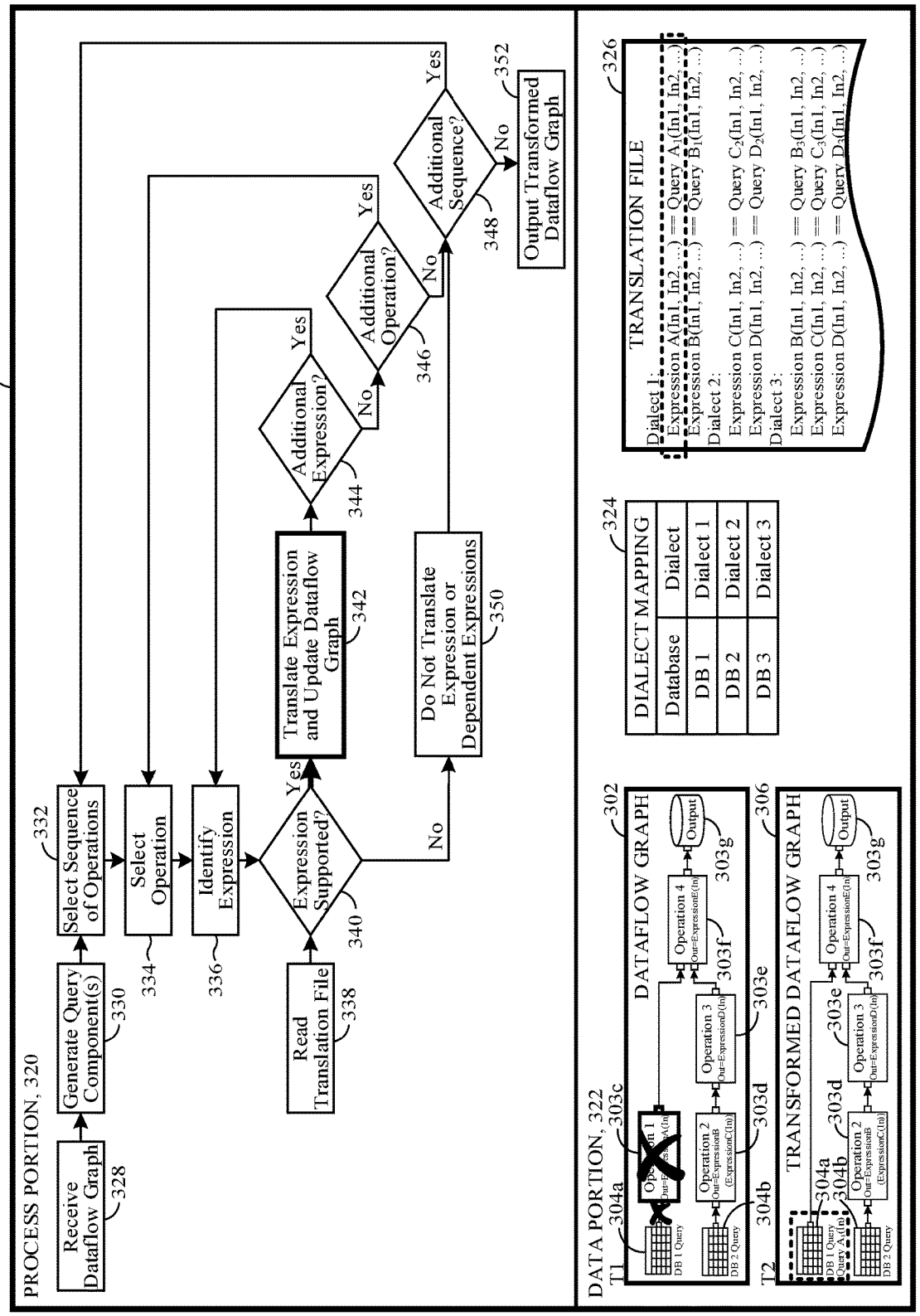

After selecting an operation, the transformation engine 118 identifies (336) an expression within the operation, reads (338) the translation file 326, and determines (340) whether the expression is supported by the database (e.g., whether the expression is capable of being translated from the language of the dataflow graph to the language of the database). As shown in FIG. 3I, the transformation engine 118 identifies the expression "ExpressionA(In)" for "Operation 1." Because "Operation 1" is configured to process data received from database "DB 1" (e.g., database 110a), it can only logically be pushed down to database "DB 1." As such, the transformation engine 118 considers whether the identified expression can be translated to the language of the database "DB 1." To do so, the transformation engine 118 uses the dialect mapping 324 to determine that the database "DB 1" uses the "Dialect 1" language. The transformation engine 118 then accesses the translation file 326 to determine whether the expression "ExpressionA(In)" is supported by the database "DB 1" using "Dialect 1." Since there is a match (indicated by the bold dashed line), the transformation engine 118 translates (342) the expression to a query in the "Dialect 1" language. In addition, the transformation engine 118 updates the dataflow graph 302 (shown at time T1) to insert the query into the query component 304a and remove the component 303c representing "Operation 1," producing a transformed dataflow graph 306 (at time T2) as shown in FIG. 3J.

Figure 3K:
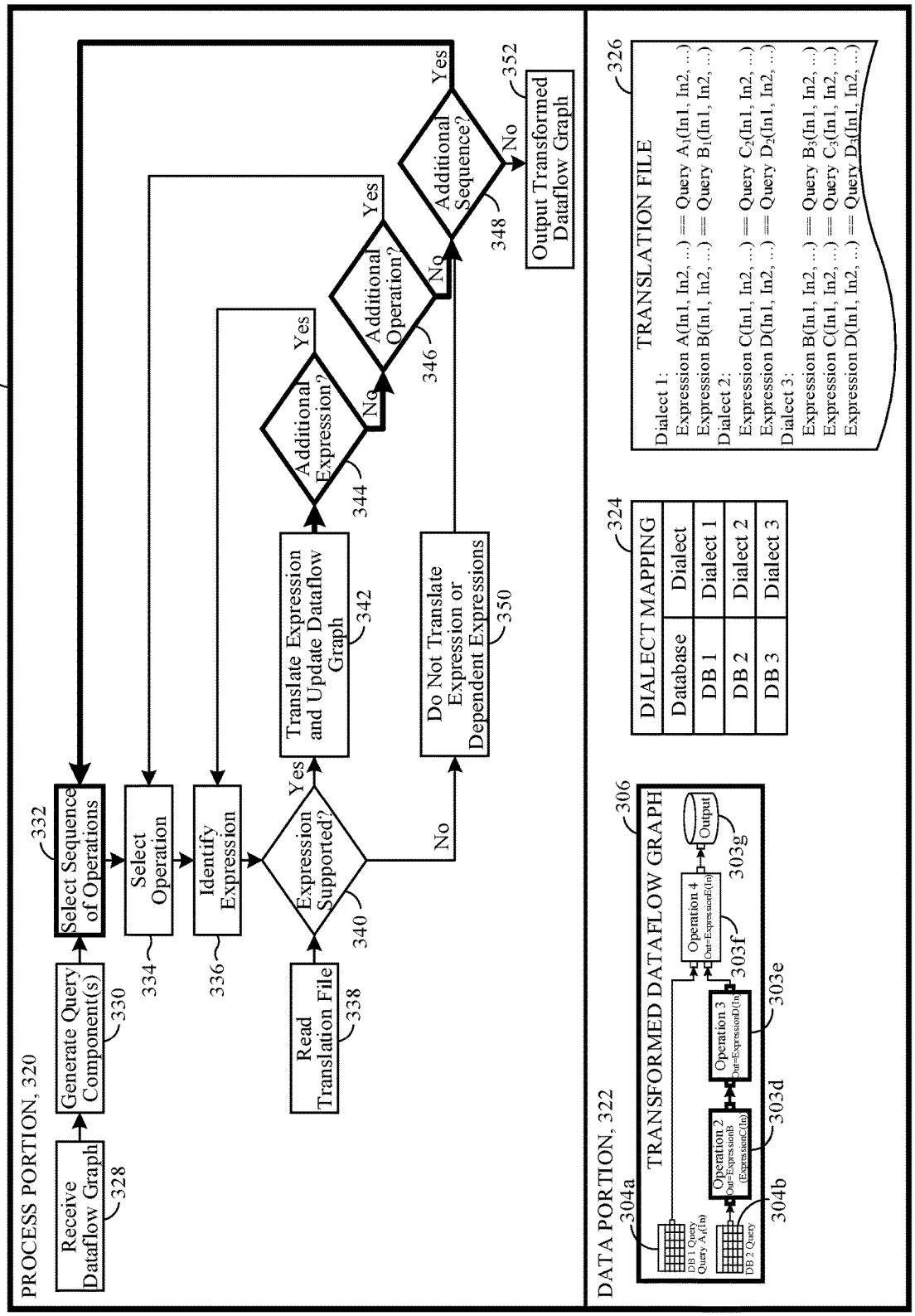
Figure 3L:
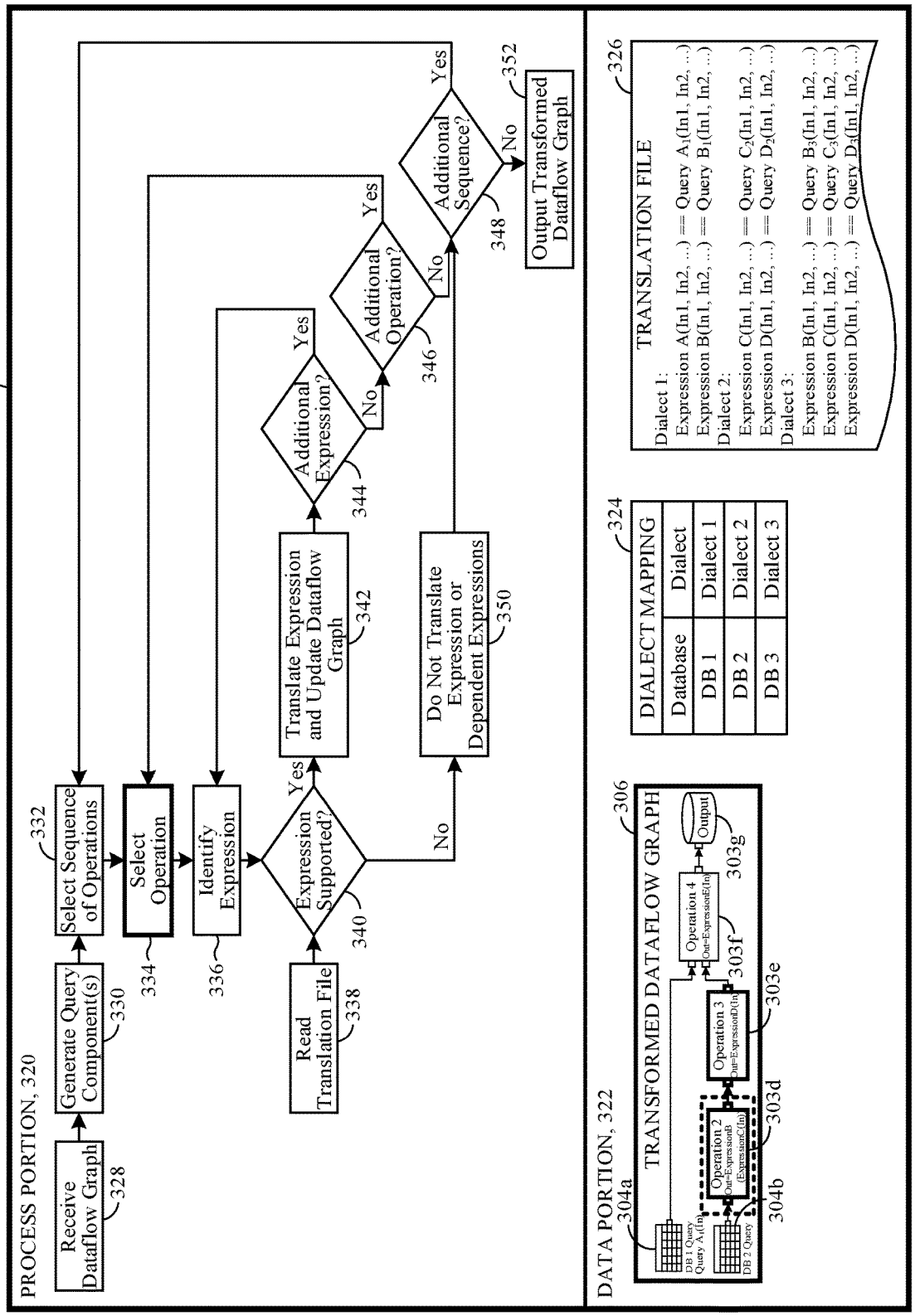
Figure 3M:
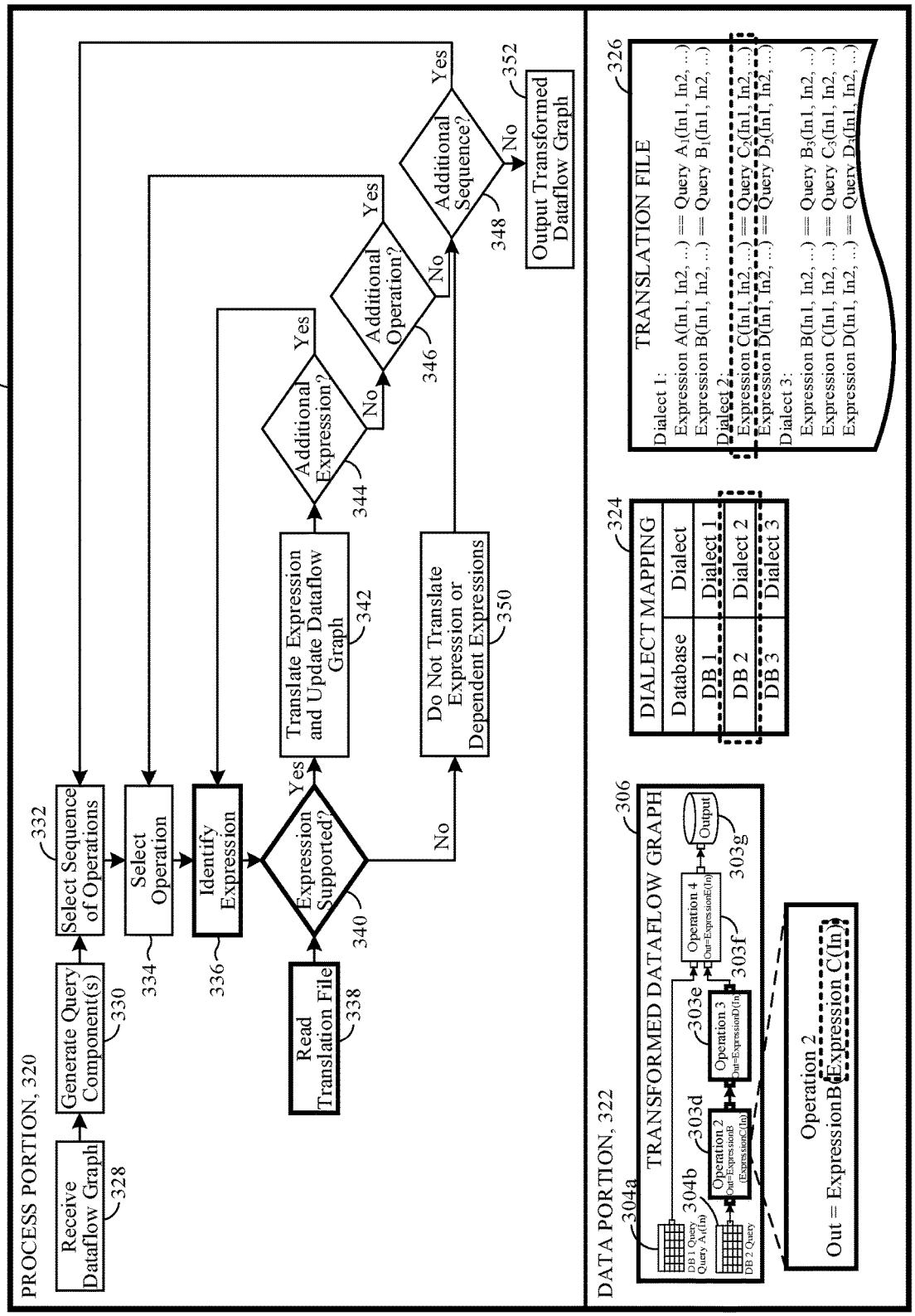
Figure 3N:
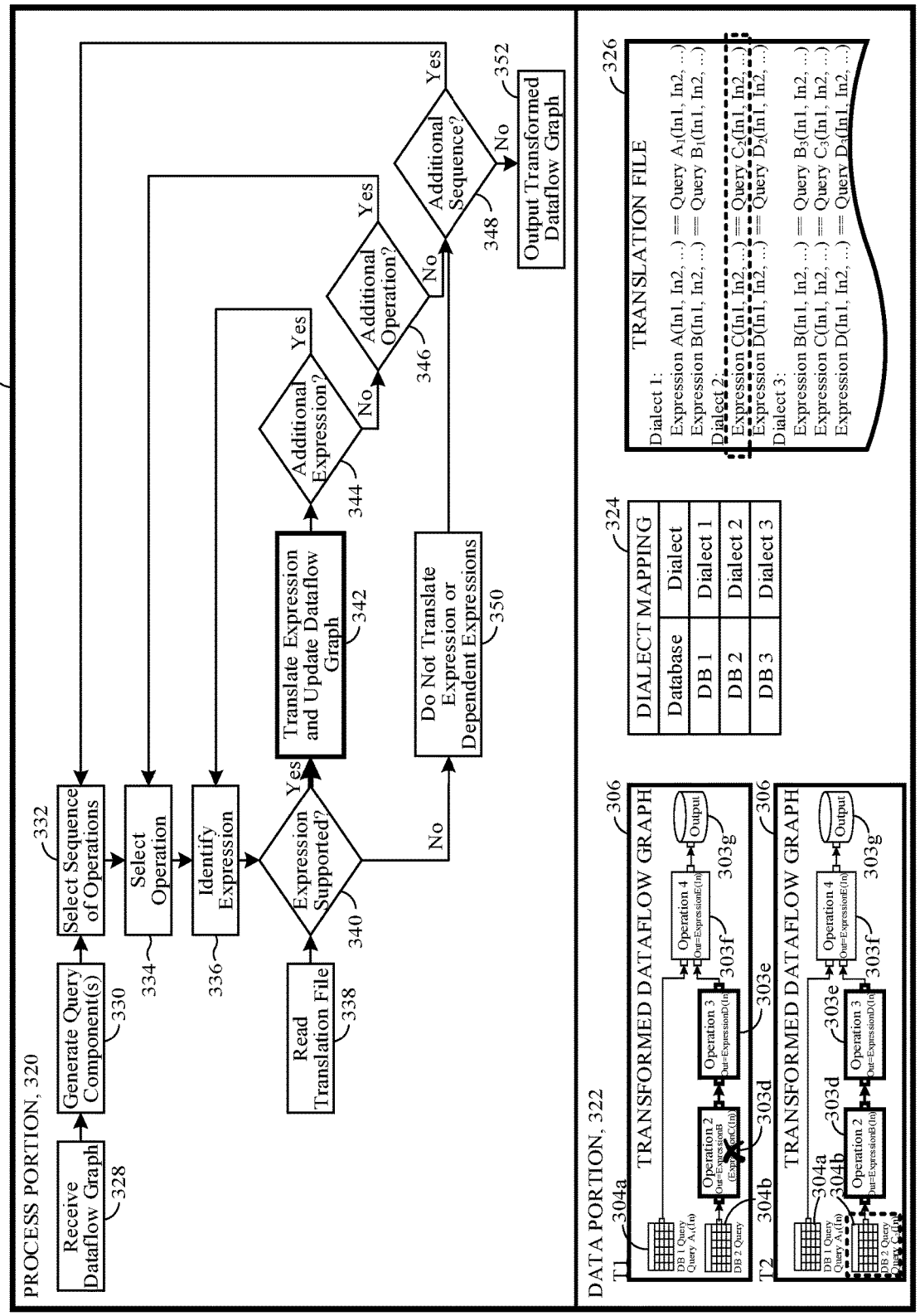

Referring to FIG. 3K, the transformation engine 118 determines that there are no additional expressions in the selected operation (344) and that there are no additional operations in the selected sequence (346), but determines that there is an additional sequence for consideration (348). Accordingly, the transformation engine 118 selects (332) a new sequence of operations in the transformed dataflow graph 303 to consider for translation. In this example, the selected operations include "Operation 2" represented by component 303d and "Operation 3" represented by component 303e. The transformation engine 118 then selects (334) an operation for consideration ("Operation 2," as shown in FIG. 3L) and identifies (336) an expression within the operation. Since "Operation 2" includes a nested expression, the transformation engine 118 begins with the independent expression "ExpressionC(In)," reads (338) the translation file 326, and determines (340) whether the expression is supported by the database, as shown in FIG. 3M. Because "Operation 2" is configured to process data received from database "DB 2" (e.g., database 110b), the transformation engine 118 considers whether the identified expression can be translated to the language of the database "DB 2." To do so, the transformation engine 118 uses the dialect mapping 324 to determine that the database "DB 2" uses the "Dialect 2" language. The transformation engine 118 then accesses the translation file 326 to determine whether the expression "ExpressionC(In)" is supported by the database "DB 2" using "Dialect 2." Since there is a match (indicated by the bold dashed line), the transformation engine 118 translates (342) the expression to a query in the "Dialect 2" language. In addition, the transformation engine 118 updates the transformed dataflow graph 306 (shown at time T1) to insert the query into the query component 304b and remove the expression from the component 303d representing "Operation 2," producing an updated dataflow graph 306 (at time T2) as shown in FIG. 3N.

Figure 3O:
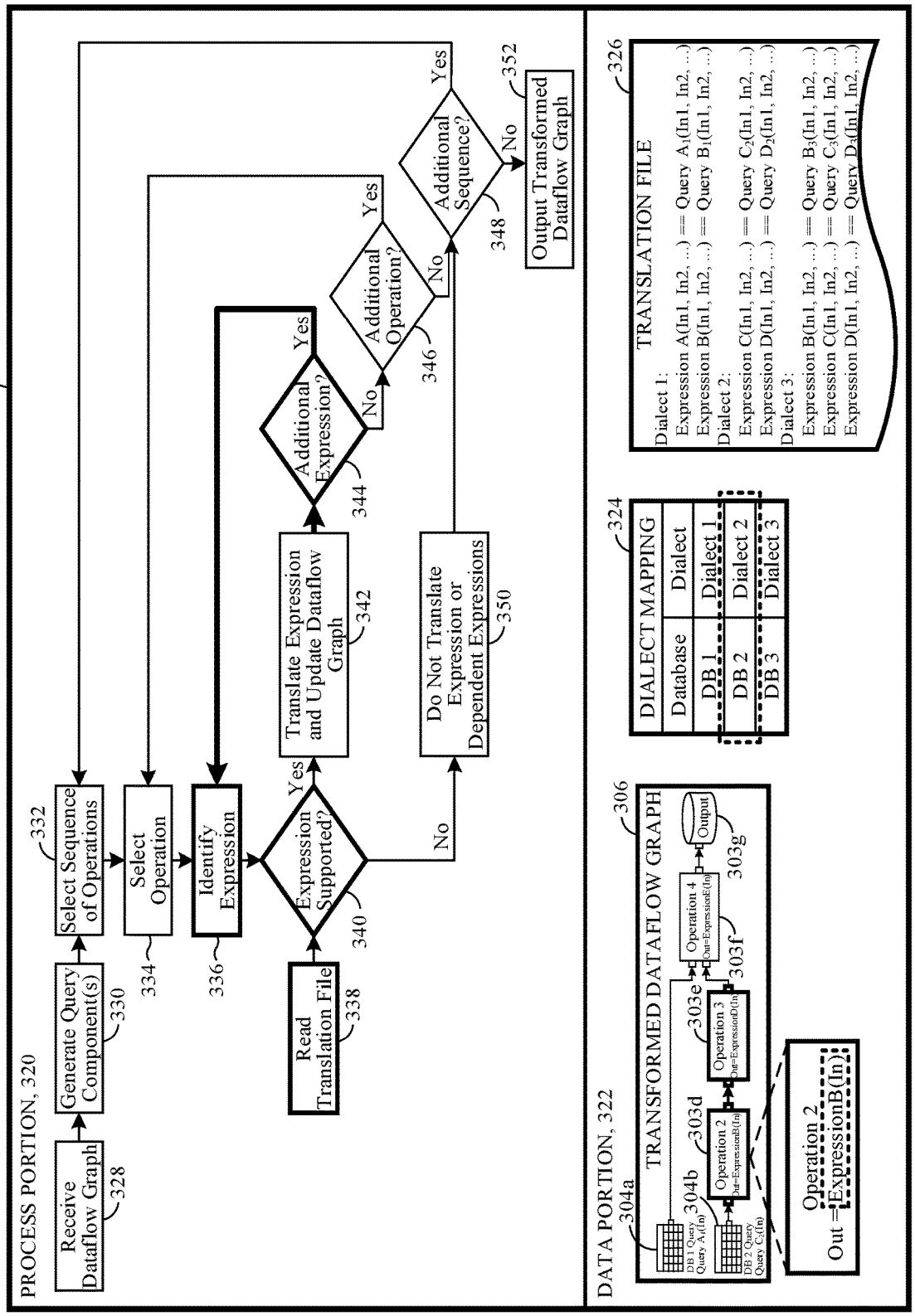
Figure 3P:
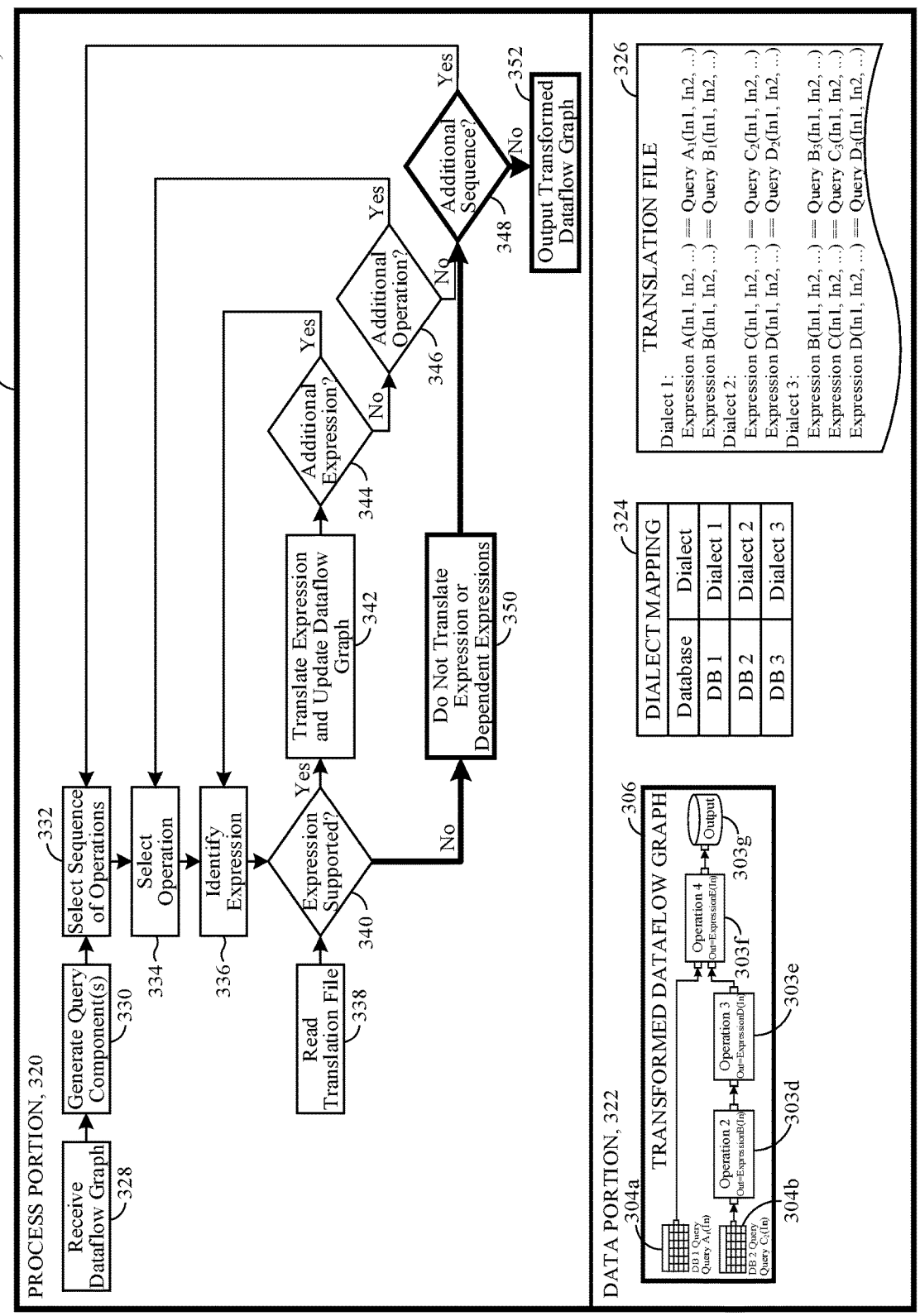
Figure 3Q:
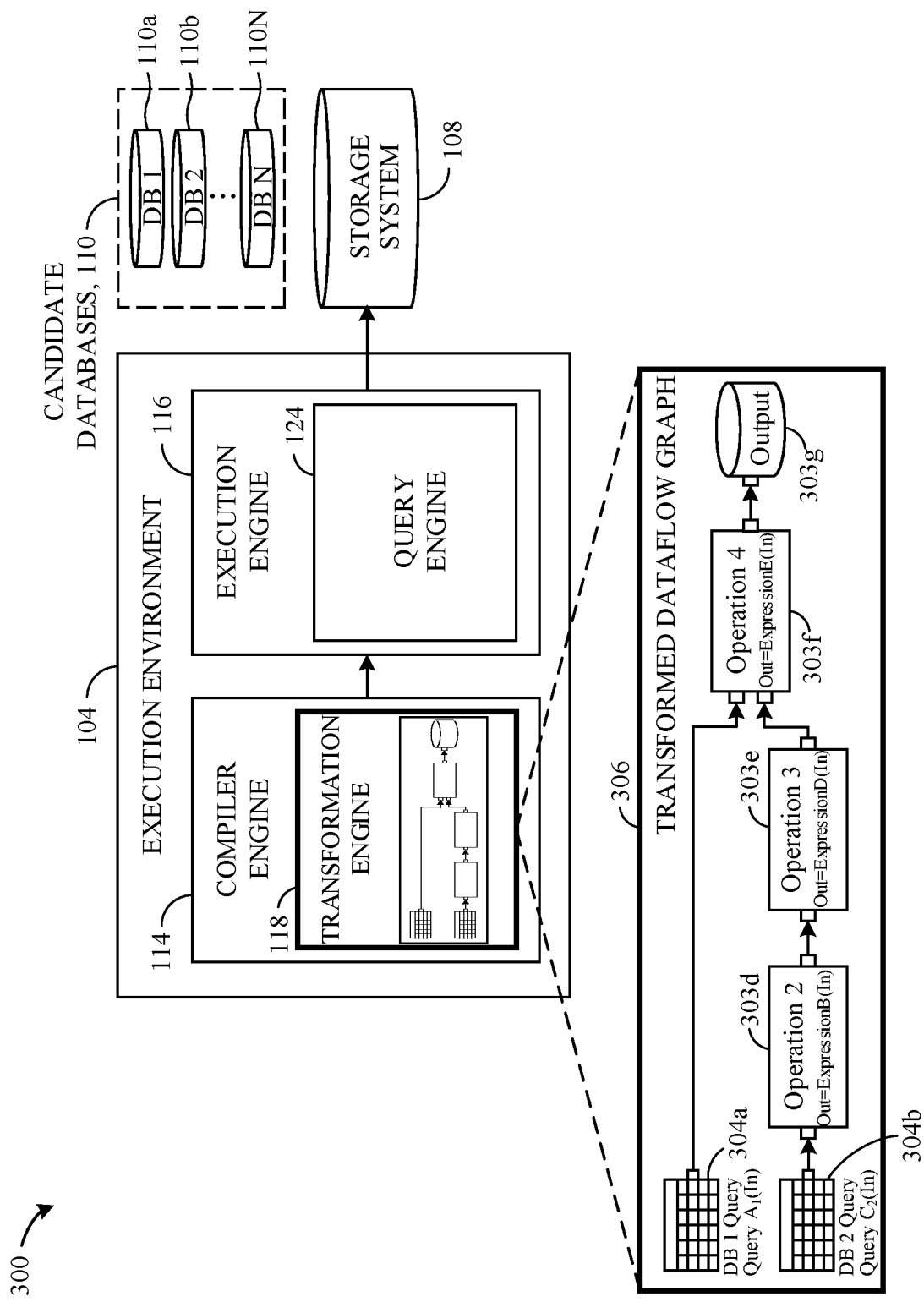
FIGS. 3Q to 3T are block diagrams showing additional details of a system for transforming operations of a computer program for execution at a database.

After translating "ExpressionC(In)" and updating the dataflow graph 306 accordingly, the transformation engine 118 determines (344) that there are additional expressions for the selected operation. As such, the transformation engine 118 identifies (336) "ExpressionB(In)," reads (338) the translation file 326, and determines (340) whether the expression is supported by the database "DB 2," as shown in FIG. 3O. Because there is no match for "ExpressionB(In)" in the translation file 326, the transformation engine 118 determines that the expression is not supported by the "Dialect 2" language used by database "DB 2." As a result, the transformation engine 118 does not translate (350) the expression or any dependent expressions. Because "Operation 3" represented by component 303e and "Operation 4" represented by component 303f each depend at least in part on "Operation 2" (and "ExpressionB(In)) in this example, the transformation engine 118 does not attempt to translate or push down these operations or their corresponding expressions. As a result, the transformation engine 118 determines (348) that there are no additional sequences to consider and outputs (352) the transformed dataflow graph, as shown in FIG. 3P.

Note that although the transformation engine 118 did not consider the operations represented by components 303*e* and 303*f* in the above example, it may consider them in other examples where the operations do not depend on an operation that is incapable of being translated or pushed down. In addition, in some examples the transformation engine 118 can reorder the operations or their corresponding expressions, including breaking operations or expressions into separate components, in order to make the operations or expressions capable of push down. For example, in an alternative version of the above example, the transformation engine 118 can swap the order of "Operation 2" and "Operation 3" to allow "Operation 3" to be pushed down if doing so would not affect the intended result of the dataflow graph.

Figure 3R:
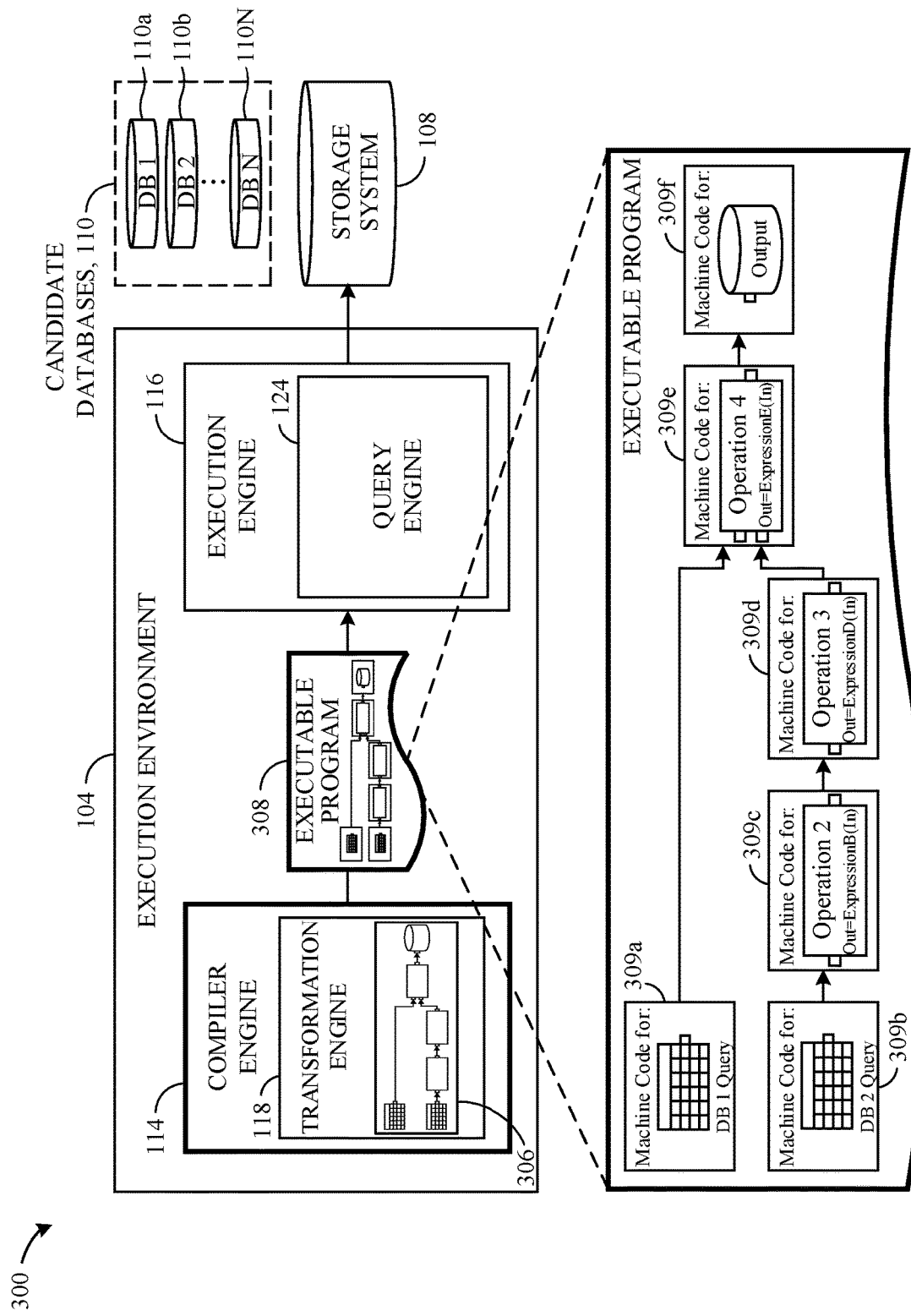
Figure 3S:
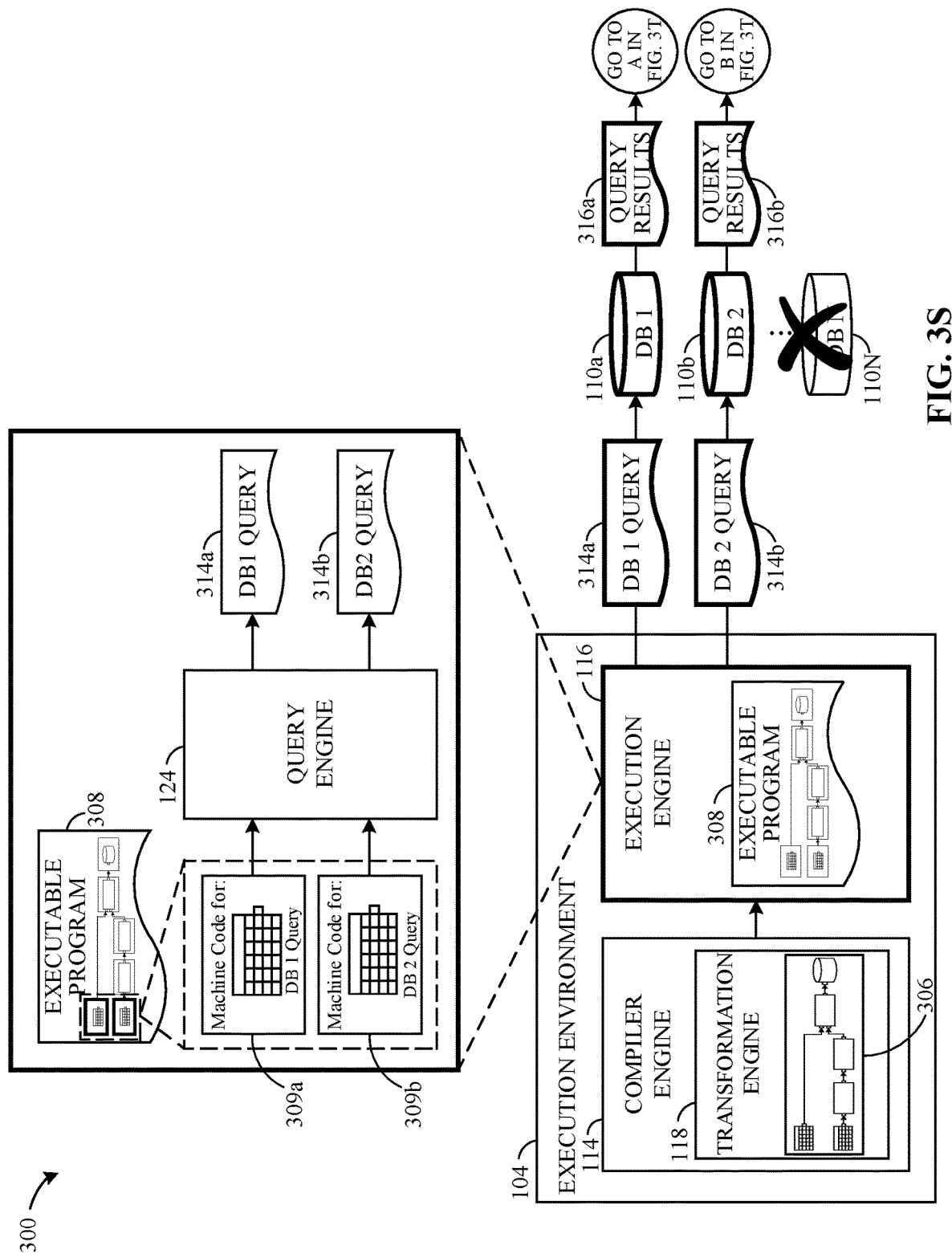
Figure 3T:
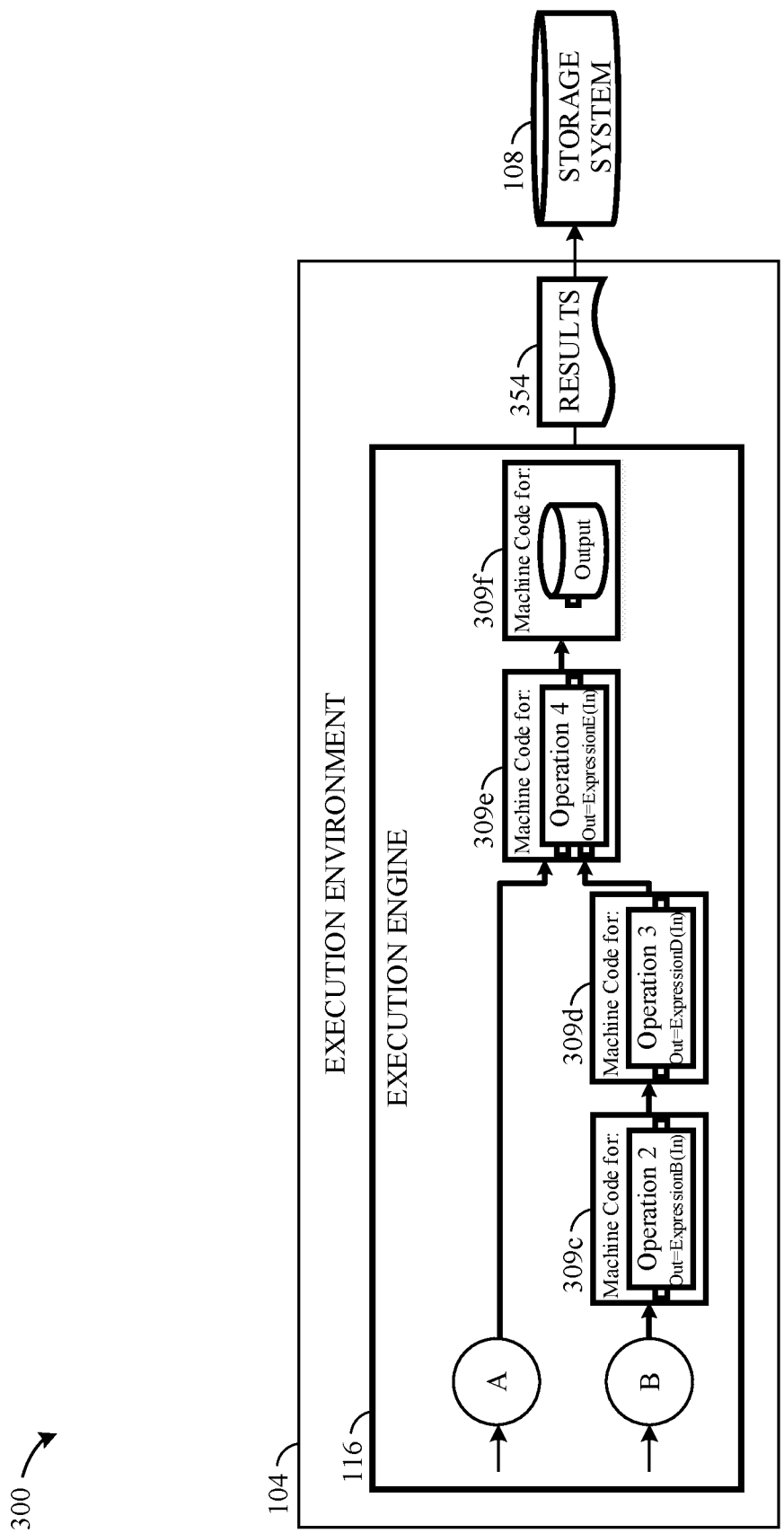

FIGS. 3Q to 3T show additional details of the system 300 for transforming operations of a computer program for execution at a database. After transforming operations of the dataflow graph 302 to produce the transformed dataflow graph 306, the transformation engine 118 passes the transformed graph 306 to the compiler engine 114 for compilation. The compiler engine 114 compiles the transformed dataflow graph 306 into an executable program 308 having a machine code 309*a*, 309*b*, 309*c*, 309*d*, 309*e*, 309*f* representing instructions that can be carried out to perform the operations of the transformed dataflow graph 306, as shown in FIG. 3R. The compiler engine 114 provides the program 308 to the execution engine 116 for execution. As described above, the execution engine 116 can begin by executing a portion of the program 308 associated with the translated portion of the dataflow graph, as shown in FIG. 3S. In particular, the execution engine 116 executes a portion of the program 308 including machine code 309*a*, 309*b* representing instructions for the queries to the databases 110*a*, 110*b*. In doing so, the execution engine 116 causes the query engine 124 (or the execution engine itself) to establish communication with the databases 110*a*, 110*b* to be queried and transmit queries 314*a*, 314*b* (which can be the same as the queries inserted into the query components 304*a*, 304*b* by the transformation engine 118) to the respective databases 110*a*, 110*b*. Each of the databases 110*a*, 110*b* executes the respective query 314*a*, 314*b* to produce query results 316*a*, 316*b*, and the query results 316*a*, 316*b* are returned to the query engine 124 (or the execution engine 116, or both).

Upon receiving the query results 316*a*, 316*b*, the execution engine 116 executes a portion of the program 308 associated with the untranslated portion of the dataflow graph with the query results 316*a*, 316*b* as inputs. Specifically, the execution engine 116 executes a portion of the program 308 including machine code 309*c*, 309*d*, 309*e*, 309*f* representing operations of the dataflow graph that were not translated or pushed down to the databases 110. The results 354 from execution of the program 310 can be stored in, for example, the storage system 108, or displayed to a user, or both, among others.

Figure 4A:
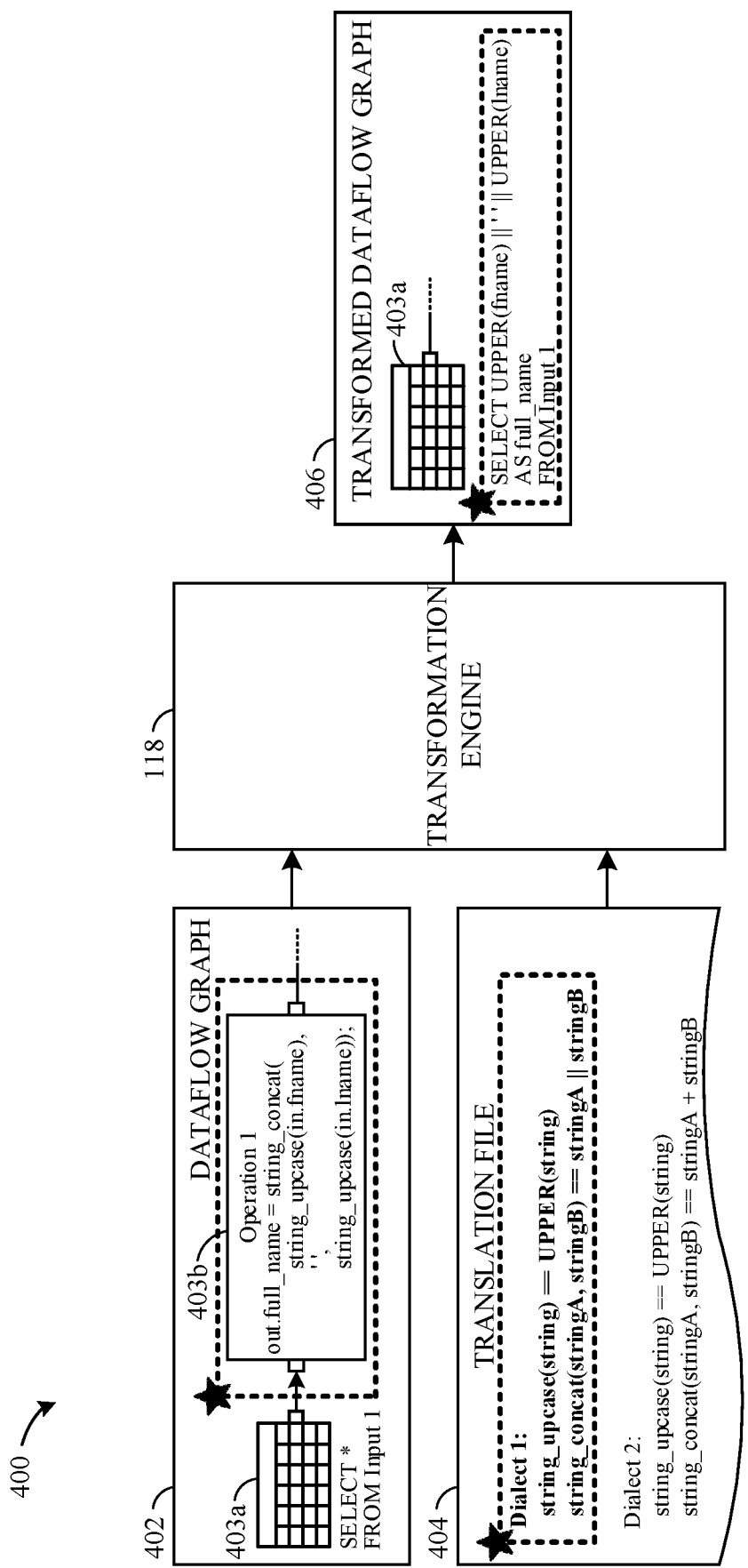
FIGS. 4A and 4B are block diagrams of examples of transforming operations of a computer program for execution at a database.

Referring to FIG. 4A, an environment 400 shows a real-world example of transforming operations of a computer program for execution at a database. In this example, the transformation engine 118 receives a dataflow graph 402 having an input query component 403*a* and an operation component 403*b*. Note that only a portion of the dataflow graph 402 is shown in this example. The input query component 403*a* specifies a query in the language of a database (e.g., a database 110) to retrieve all records from a table "Input 1" in the database. The operation component 403*b* specifies an operation in the language of the dataflow graph 402 configured to capitalize and concatenate the first name ("fname") and last name ("lname") fields (with a space in the middle) for each record in in the input data.

To determine whether some or all of the expressions in the operation component 403*b* can be pushed down to the database, the transformation engine 118 first identifies the language used by the database (e.g., based on the input query component 403*a*, a file associated with the input component 403*a*, etc.). Assuming the transformation engine 118 determines that the database language is "Dialect 1," the transformation engine 118 reads a translation file 404 to determine whether some or all of the expressions represented by the operation component 403*b* are supported by the "Dialect 1" language. Because there is a match for each expression of the operation, the transformation engine 118 is able to fully translate the operation from the language of the dataflow graph 402 to the language of the database. The transformation engine 118 produces a transformed dataflow graph 406 in which the operation component 403*b* is removed and the translated operation is inserted into the input query component 403*a*, effectively pushing down the processing specified in the operation component 403*b* to the database.

Figure 4B:
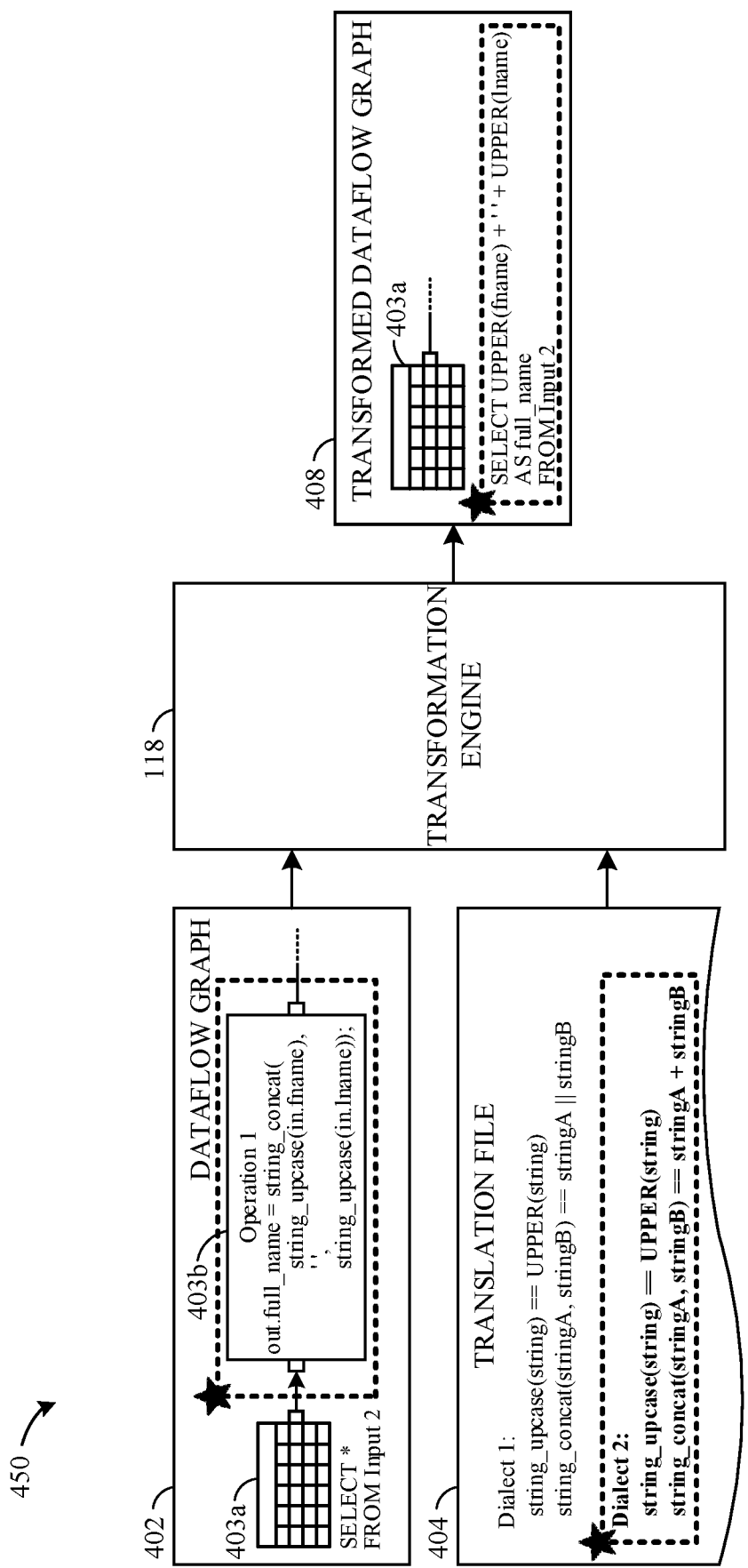

Referring to FIG. 4B, an environment 450 shows another real-world example of transforming operations of a computer program for execution at a database. The example shown in environment 450 is similar to that shown in environment 400, except that the input component 403*a* now accesses data from a table "Input 2" in a database using the "Dialect 2" language. Much like the previous example, the transformation engine 118 reads the translation file 404 to determine whether some or all of the expressions represented by the operation component 403*b* are supported by the language of the database. In this example, the transformation engine 118 again finds that there is a match for each expression of the operation, albeit with a slightly different translation. As a result, the translation engine 118 produces a transformed dataflow graph 408 in which the translated operation is inserted into the input query component 403*a* in place of the operation 403*b*. As shown from the examples in environments 400 and 450, the techniques described here enable the same dataflow graph to be optimized and run on different databases using different languages without requiring modification to the underlying dataflow graph source code.

Figure 5:
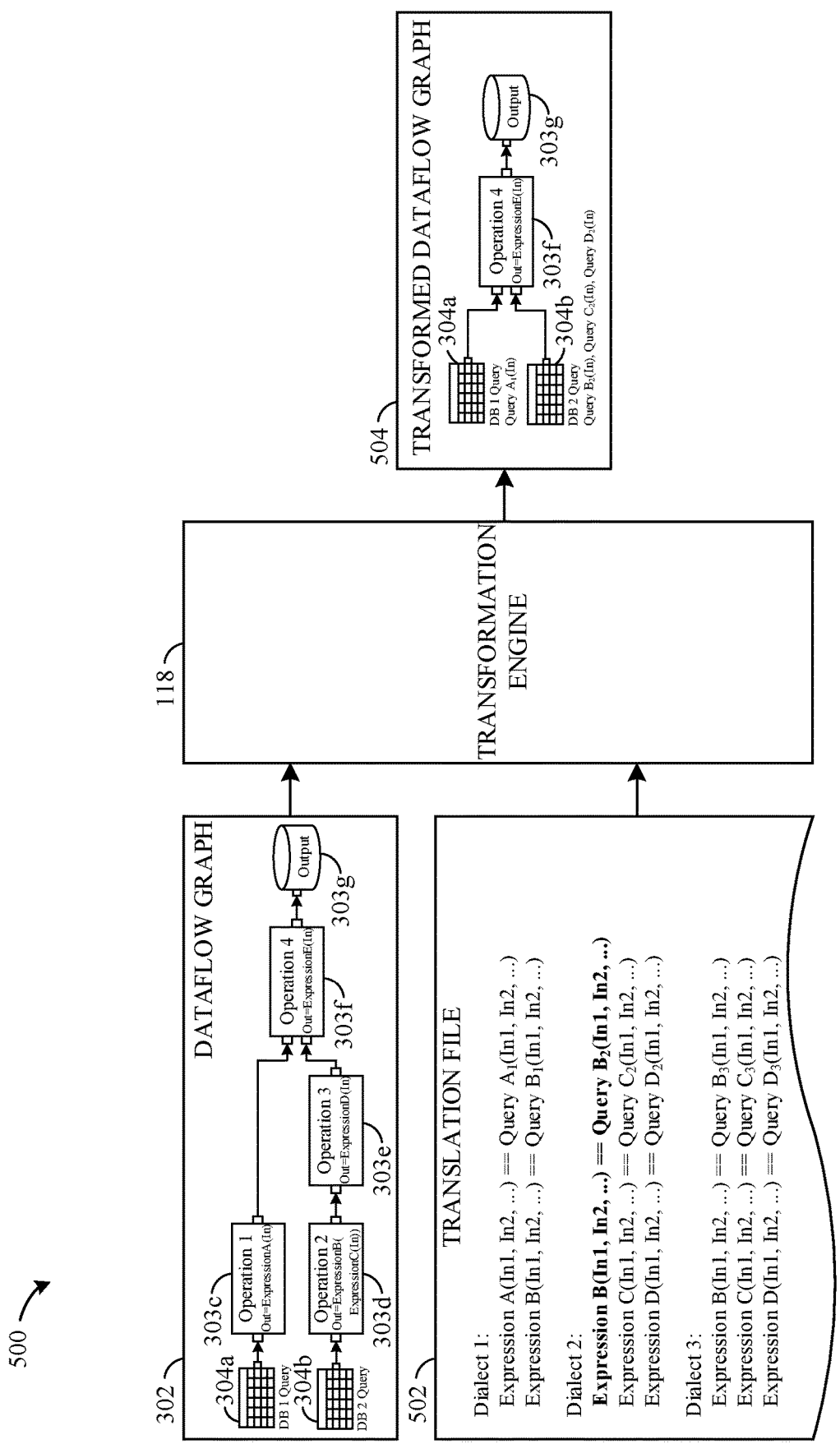
FIG. 5 is a block diagram of an example of the extensibility of a translation file.

Referring to FIG. 5, an environment 500 shows an example of the extensibility of a translation file 502 in accordance with the techniques described here. In this example, the transformation engine 118 receives a dataflow graph 302, which is the same as the dataflow graph 302 described in FIGS. 3A-3T (after the input query components 304*a*, 304*b* have been added). Recall that the translation engine 118 was unable to translate or push down "ExpressionB(In)" specified in component 303*d*, as the translation file did not indicate that such an operation was within the capabilities of the "Dialect 2" language used by the "DB 2" database (e.g., database 110*b*). As a result, the transformation engine was not able to translate or push down any of the operations represented by component 303*e* despite the translation file indicating that these operations were supported, as these operations depended on the data output from component 303*d*.

In the environment 500, the translation file 502 has been extended to include support for "ExpressionB(In)" (shown in bold in FIG. 5). As a result, the transformation engine 118 is now able to transform the same dataflow graph 302 into a highly optimized and efficient transformed dataflow graph 504 in which all of the operations specified in components 303*d* and 303*e* are pushed down (note that the operation represented by component 303*f* cannot be pushed down in this example as it depends on data from two different databases). Thus, the translation file 502 (in addition to the other techniques described here) provides tremendous flexibility by allowing a user to extend the capabilities of the system to any specific database they encounter (or to update an existing database). Because the system picks up the translation file at runtime, the translation is not encoded in binary and allows the same source code (e.g., for a computer program, such as a dataflow graph) to be run efficiently on any database.

Figure 6A:
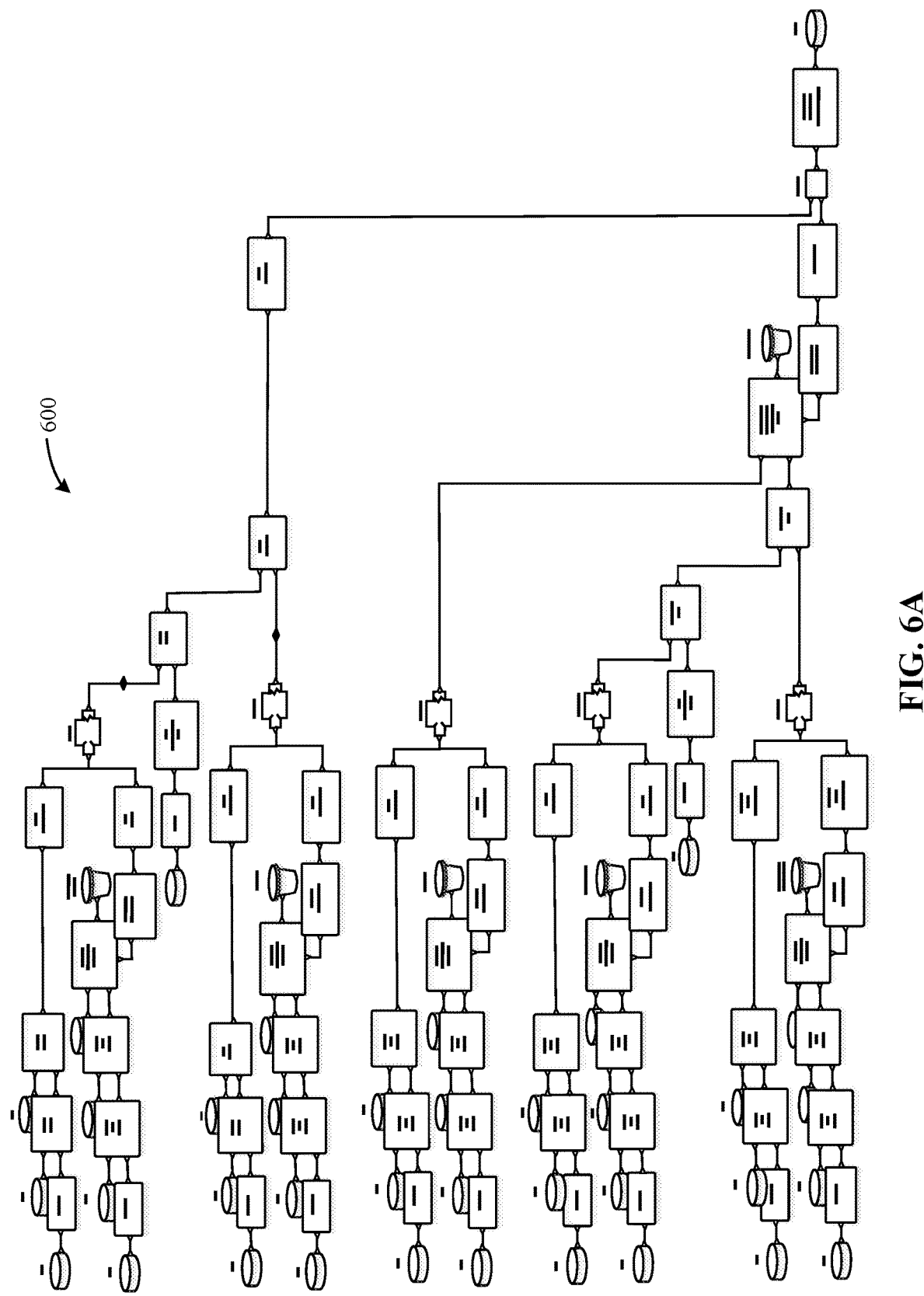
FIGS. 6A to 6C show an executable dataflow graph at various stages of optimization.
Figure 6B:
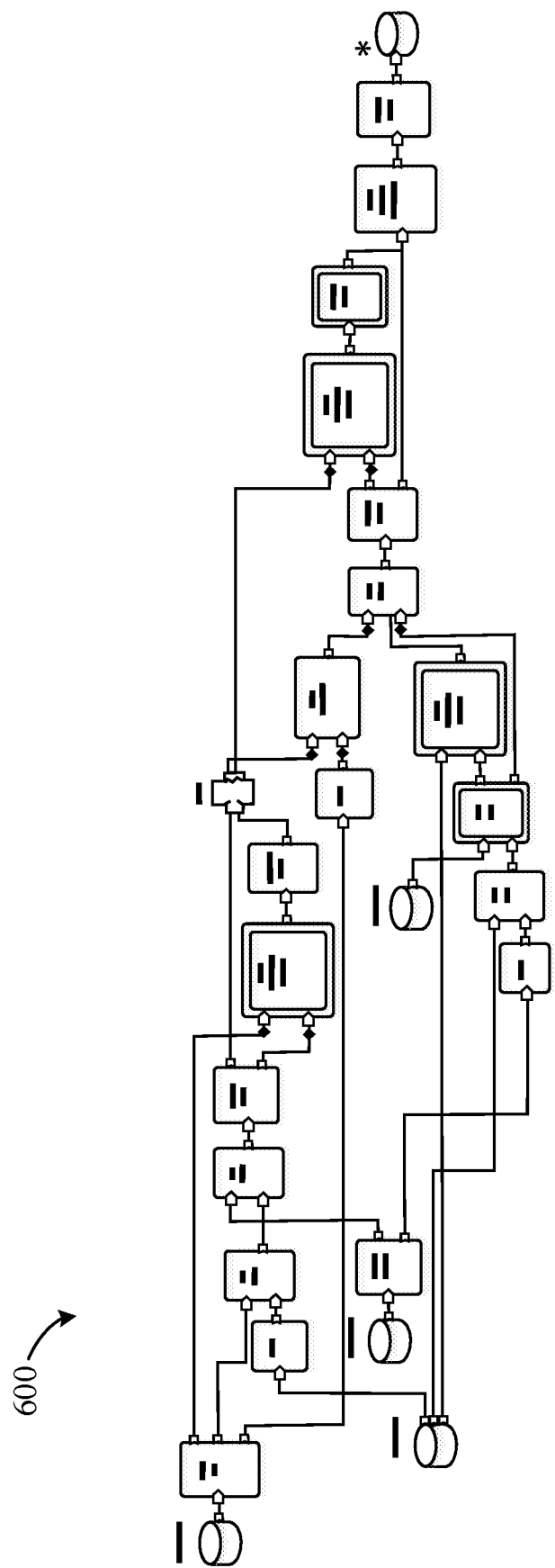
Figure 6C:
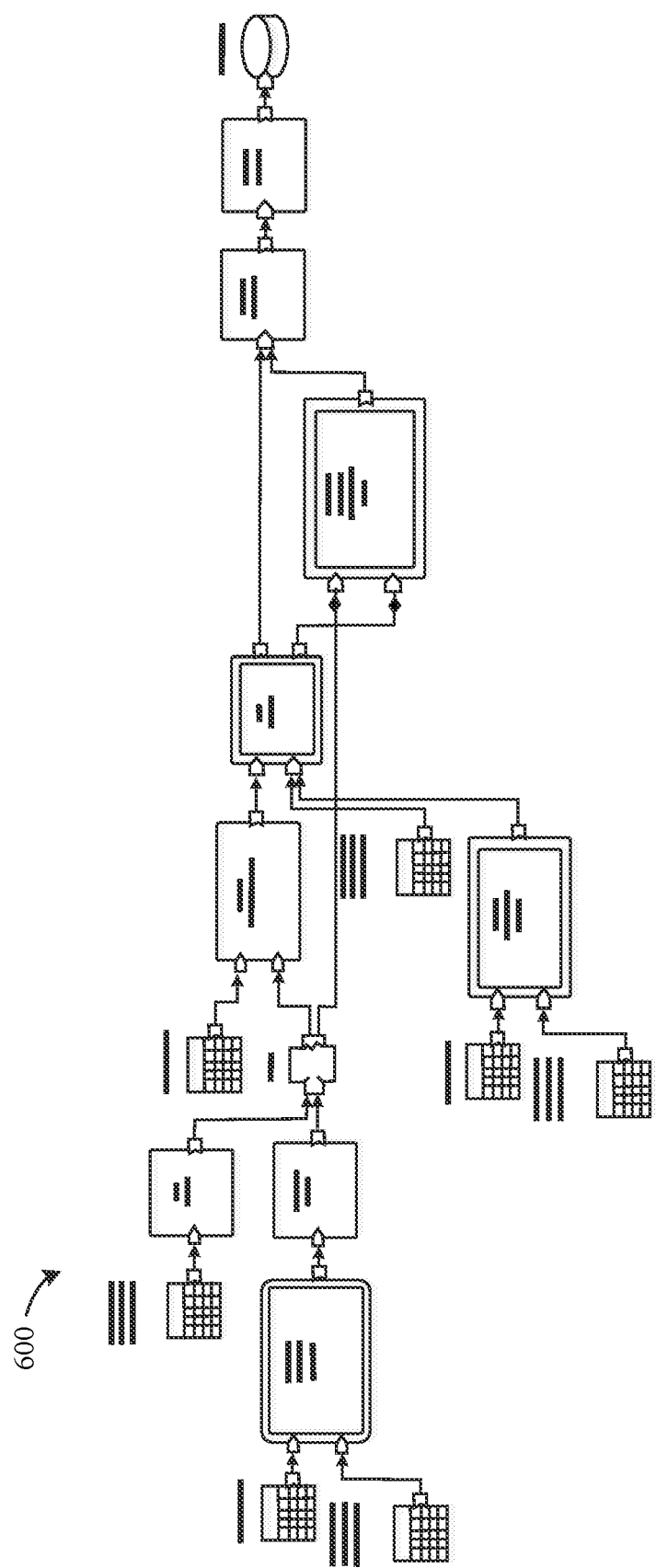

Referring to FIGS. 6A-6C, a dataflow graph 600 at various stages of optimization is shown. In FIG. 6A, the dataflow graph 600 is completely unoptimized, resulting in substantial inefficiencies and burdens on computing resources. In FIG. 6B, the dataflow graph 600 has been optimized such that it is faster, more efficient and uses fewer computational resources. The dataflow graph 600 is optimized using techniques such as dead or redundant component elimination, early filtering, or record narrowing, or combinations of them, among others. Additional details on techniques for optimizing a dataflow graph are described in U.S. patent application Ser. No. 15/993,284, titled "Systems and Methods for Dataflow Graph Optimization," the entire content of which is incorporated herein by reference. Finally, in FIG. 6C, the dataflow graph 600 has been further optimized using the pushdown techniques described here. Because operations previously executed locally (e.g., by the execution environment) have been pushed down to one or more databases, the dataflow graph 600 shown in FIG. 6C is even faster, more efficient, and uses fewer computational resources than the dataflow graphs shown in FIGS. 6A and 6B.

Figure 7:
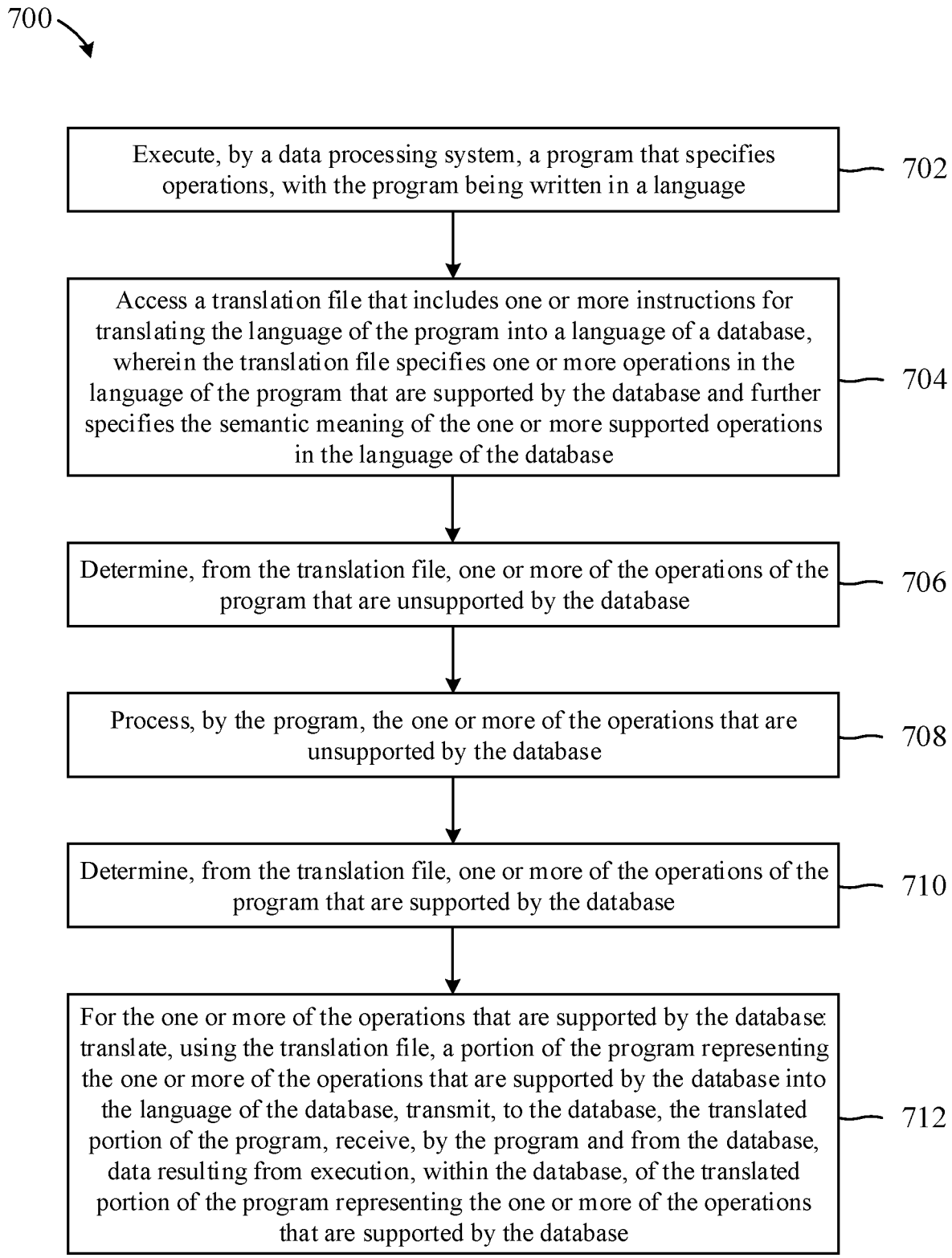
FIG. 7 is a flowchart of a process for transforming operations of a computer program for execution at a database.

FIG. 7 illustrates a flowchart of an example process 700 for transforming operations of a computer program for execution at a database. The process 700 can be implemented by one or more of the systems (e.g., the systems 100, 200, 250, 300) and components (e.g., the execution environment 104 or a component thereof, such as the transformation engine 118) described herein, including one or more computing systems configured to implement the technology described with reference to FIGS. 1-6.

Operations of the process 700 include executing (702), by a data processing system, a program (e.g., a computer program) that specifies operations, with the program being written in a language (e.g., a programming language). For example, the program is computer program, such as a dataflow graph (e.g., the dataflow graph 112, 202, 302, etc.) having nodes representing the operations connected by links representing flows of data between the operations. In an example, the program is written in a data manipulation language (DML).

Operations of the process 700 further include accessing (704) a translation file that includes one or more instructions for translating the language of the program into a language of a database. The translation file (e.g., the translation file 120) specifies one or more operations in the language of the program that are supported by the database and further specifies the semantic meaning of the one or more supported operations in the language of the database. In an example, the database is a relational database, and the language of the database is a structured query language (SQL) or a SQL dialect. In an example, an indication of the language of the database is received from the program. In an example, the translation file includes one or more instructions for translating the language of the program into a language of a plurality of databases including the language of the database. In an example, the semantic meaning accounts for at least one of a data type, a meaning of an operator, a meaning of a function, or an intended result of an operation, of the one or more supported operations in the language of the database. In an example, the translation file is extensible, accessed at runtime, and is not encoded in the program (e.g., not encoded in binary or machine code for the program, and instead accessible as, for example, a separate file in storage).

Based on the translation file, one or more of the operations of the program that are unsupported by the database are determined (706). The one or more of the operations that are unsupported by the database are processed by the program (708). In an example, the operations 706 and 708 are optional. In an example, the program does not process the one or more of the operations of the program that are supported by the database (e.g., the program only processes the one or more of the operations that are unsupported by the database). In an example, the data processing system does not execute the portion of the program representing the one or more of the operations that are supported by the database. In an example, the one or more operations that are unsupported by the database are processed by the program after receiving the data resulting from execution of the one or more of the operations that are supported by the database, with the data resulting from such execution being used as input data for the one or more of the operations that are unsupported by the database.

Using the translation file, one or more of the operations of the program that are supported by the database are determined (710). In an example, determining the one or more of the operations that are supported (or unsupported, or both) by the database includes applying one or more pattern matching rules to the one or more operations in the translation file specified in the language of the program.

For the one or more of the operations that are supported by the database, the operations of the process include (712): translating, based on the translation file, a portion of the program representing the one or more of the operations that are supported by the database into the language of the database, transmitting, to the database, the translated portion of the program, and receiving, by the program and from the database, data resulting from execution, within the database, of the translated portion of the program representing the one or more of the operations that are supported by the database. In an example, translating the portion of the program representing the one or more of the operations that are supported by the database includes generating one or more queries to the database in the language of the database. In an example, the queries to the database specify the one or more operations (or equivalents of the one or more operations) in the language of the database. In an example, execution of the queries within the database produces the data resulting from execution, within the database, of the translated portion of the program representing the one or more of the operations that are supported by the database. In an example, at least one of the operations of the program comprises a query operation, and the process includes removing, from the program, the one or more operations that are supported by the database and inserting, into the query operation, the one or more queries to the database in the language of the database. In an example, one or more additional operations are executed by the program on the data received from the database and on data returned from the processing of the one or more of the operations that are unsupported by the database.

Implementations of the subject matter and the operations described in this specification, including the development environment 102, the execution environment 104, and components thereof, can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs (also referred to as a data processing program) (i.e., one or more modules of computer program instructions, encoded on computer storage medium for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The subject matter may be implemented on computer program instructions stored on a non-transitory computer storage medium.

The operations described in this specification can be implemented as operations performed by a data processing apparatus on data stored on one or more computer-readable storage devices or received from other sources.

The term "data processing apparatus" encompasses all kinds of apparatus, devices, and machines for processing data including, by way of example: a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that provides an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)). Devices suitable for storing computer program instructions and data include all forms of non-volatile memory, media and memory devices, including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

Implementations of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network (LAN) and a wide area network (WAN), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any implementations or of what may be claimed, but rather as descriptions of features specific to particular implementations. Certain features that are described in this specification in the context of separate implementations can also be implemented in combination in a single implementation. Conversely, various features that are described in the context of a single embodiment can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Other implementations are within the scope of the following claims.

What is claimed is:

1. A method for executing, by a data processing system, one or more portions of a program that specifies operations, with the program being written in a first language, including:
   receiving, from a device, a translation file that is distinct from the program, wherein the translation file includes one or more instructions for translating the first language of the program into a second language of a database, wherein the translation file specifies one or more operations in the first language of the program that are supported by the database and further specifies the one or more supported operations in the second language of the database;
   determining, from the translation file, one or more of the operations of the program that are unsupported by the database;
   transforming the one or more of the operations determined that are written in the first language of the program in preparation for execution, with the one or more of the operations transformed being unsupported by the database;
   determining, from the translation file, one or more of the operations of the program that are supported by the database; and
   for the one or more of the operations that are supported by the database:
     translating, using the translation file, a portion of the program representing the one or more of the operations that are supported by the database into the second language of the database;
     transmitting, from the data processing system to the database, the translated portion of the program; and
     receiving, by the data processing system and from the database, data resulting from execution, within the database, of the translated portion of the program representing the one or more of the operations that are supported by the database; and
   in accordance with the received data resulting from execution, within the database, of the translated portion of the program representing the one or more of the operations that are supported by the database, executing, by the data processing system, the one or more of the transformed operations of the program that are unsupported by the database.

2. The method of claim 1, including performing, by the data processing system, one or more additional operations on the data received from the database and on data resulting from execution of the one or more of the transformed operations that are unsupported by the database.

3. The method of claim 1, wherein the program includes an executable dataflow graph having components representing the operations connected by links representing flows of data between the operations.

4. The method of claim 1, wherein translating the portion of the program representing the one or more of the operations that are supported by the database includes generating one or more queries to the database in the language of the database for performing, within the database, the one or more of the operations.

5. The method of claim 4, wherein at least one of the operations of the program includes a query operation, the method including:
   removing, from the program, the one or more operations that are supported by the database; and
   inserting, into the query operation, the one or more queries to the database in the language of the database.

6. The method of claim 1, wherein determining the one or more of the operations that are supported by the database includes applying one or more pattern matching rules to the one or more operations in the translation file specified in the language of the program.

7. The method of claim 1, wherein the translation file accounts for at least one of a data type, a meaning of an operator, a meaning of a function, or an intended result of an operation, of the one or more supported operations in the language of the database.

8. The method of claim 1, wherein the translation file is not encoded in the program.

9. The method of claim 1, including receiving, from the program, an indication of the language of the database.

10. The method of claim 1, wherein the language of the program includes a data manipulation language, and wherein the language of the database includes a structured query language.

11. The method of claim 1, wherein the translation file includes one or more instructions for translating the language of the program into a language of a plurality of databases including the language of the database.

12. The method of claim 1, wherein the device comprises a computing device or memory, or both.

13. The method of claim 1, wherein receiving the translation file comprises accessing the translation file.

14. The method of claim 1, wherein the translation file is extensible.

15. The method of claim 1, wherein the first language is an interpretable language, and wherein transforming includes:
   interpreting the one or more of the operation of the program written in first language and unsupported by the database.

16. A system, including:
   one or more processors; and
   one or more storage devices storing instructions which, when executed by the one or more processors, cause the one or more processors to perform operations for executing one or more portions of a program that specifies operations, with the program being written in a first language, the operations including:

receiving, from a device, a translation file that is distinct from the program, wherein the translation file includes one or more instructions for translating the first language of the program into a second language of a database, wherein the translation file specifies one or more operations in the first language of the program that are supported by the database and further specifies the one or more supported operations in the second language of the database;

determining, from the translation file, one or more of the operations of the program that are unsupported by the database;

transforming the one or more of the operations determined that are written in the first language of the program in preparation for execution, with the one or more of the operations transformed being unsupported by the database;

determining, from the translation file, one or more of the operations of the program that are supported by the database; and for the one or more of the operations that are supported by the database:

translating, using the translation file, a portion of the program representing the one or more of the operations that are supported by the database into the second language of the database;

transmitting, to the database, the translated portion of the program; and receiving, from the database, data resulting from execution, within the database, of the translated portion of the program representing the one or more of the operations that are supported by the database; and in accordance with the received data resulting from execution, within the database, of the translated portion of the program representing the one or more of the operations that are supported by the database, executing the one or more of the transformed operations of the program that are unsupported by the database.

17. The system of claim 16, wherein the one or more storage devices store instructions which, when executed by the one or more processors, cause the one or more processors to perform operations including executing one or more additional operations on the data received from the database and on resulting from execution of the one or more of the transformed operations that are unsupported by the database.

18. The system of claim 16, wherein translating the portion of the program representing the one or more of the operations that are supported by the database includes generating one or more queries to the database in the language of the database.

19. The system of claim 18, wherein at least one of the operations of the program includes a query operation, the one or more storage devices store instructions which, when executed by the one or more processors, cause the one or more processors to perform operations including:

removing, from the program, the one or more operations that are supported by the database; and inserting, into the query operation, the one or more queries to the database in the language of the database.

20. The system of claim 16, wherein the translation file accounts for at least one of a data type, a meaning of an operator, a meaning of a function, or an intended result of an operation, of the one or more supported operations in the language of the database.

21. A non-transitory computer-readable storage medium storing instructions for causing a computing system to execute one or more portions of a program that specifies operations, with the program being written in a first language, the instructions configured to cause the computing system to:

receive, from a device, a translation file that is distinct from the program, wherein the translation file includes one or more instructions for translating the first language of the program into a second language of a database, wherein the translation file specifies one or more operations in the first language of the program that are supported by the database and further specifies the one or more supported operations in the second language of the database;

determine, from the translation file, one or more of the operations of the program that are unsupported by the database;

transform the one or more of the operations determined that are written in the first language of the program in preparation for execution, with the one or more of the operations transformed being unsupported by the database;

determine, from the translation file, one or more of the operations of the program that are supported by the database; and for the one or more of the operations that are supported by the database:

translate, using the translation file, a portion of the program representing the one or more of the operations that are supported by the database into the second language of the database;

transmit, to the database, the translated portion of the program; and receive, from the database, data resulting from execution, within the database, of the translated portion of the program representing the one or more of the operations that are supported by the database; and in accordance with the received data resulting from execution, within the database, of the translated portion of the program representing the one or more of the operations that are supported by the database, execute the one or more of the transformed operations of the program that are unsupported by the database.

22. The non-transitory computer-readable storage medium of claim 21, including instructions for cause the computing system to execute, by the program, one or more additional operations on the data received from the database and on data resulting from the execution of the one or more of the transformed operations that are unsupported by the database.

23. The non-transitory computer-readable storage medium of claim 21, wherein the program includes an executable dataflow graph having components representing the operations connected by links representing flows of data between the operations.

24. The non-transitory computer-readable storage medium of claim 21, wherein the translation file accounts for at least one of a data type, a meaning of an operator, a meaning of a function, or an intended result of an operation, of the one or more supported operations in the language of the database.

* * * * *